(12) United States Patent
Grosso et al.

(10) Patent No.: US 9,825,811 B2
(45) Date of Patent: Nov. 21, 2017

(54) CONTROL OF POWER CONSUMPTION MODES OF COMMUNICATIONS APPARATUS

(71) Applicant: Telefonaktiebolaget L M Ericsson (publ), Stockholm (SE)

(72) Inventors: Renato Grosso, Genoa (IT); Lorenzo Marchionini, Genoa (IT); Stefano Rissotto, Genoa (IT)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 186 days.

(21) Appl. No.: 14/432,210

(22) PCT Filed: Oct. 2, 2012

(86) PCT No.: PCT/EP2012/069418
§ 371 (c)(1),
(2) Date: Mar. 29, 2015

(87) PCT Pub. No.: WO2014/053166
PCT Pub. Date: Apr. 10, 2014

(65) Prior Publication Data
US 2015/0244578 A1 Aug. 27, 2015

(51) Int. Cl.
*G06F 15/173* (2006.01)
*H04L 12/24* (2006.01)
(Continued)

(52) U.S. Cl.
CPC ........ *H04L 41/0816* (2013.01); *G06F 1/3206* (2013.01); *H04L 41/0833* (2013.01);
(Continued)

(58) Field of Classification Search
CPC . H04L 41/0816; H04L 41/0833; H04L 41/12; H04L 45/125; H04L 45/127;
(Continued)

(56) References Cited

U.S. PATENT DOCUMENTS

| 8,848,538 B2* | 9/2014 | Welin | H04L 12/12 370/235 |
|---|---|---|---|
| 2011/0142060 A1* | 6/2011 | Manral | H04L 45/12 370/401 |

(Continued)

FOREIGN PATENT DOCUMENTS

| EP | 2 079 262 A1 | 7/2009 |
|---|---|---|
| EP | 2 391 055 A1 | 11/2011 |

OTHER PUBLICATIONS

PCT International Search Report, dated Nov. 14, 2013, in connection with International Application No. PCT/EP2013/067837, all pages.

(Continued)

*Primary Examiner* — Wing F Chan
*Assistant Examiner* — Joseph Maniwang
(74) *Attorney, Agent, or Firm* — Leffler Intellectual Property Law, PLLC

(57) ABSTRACT

A network management system (NMS) for a communications network has communications apparatus capable of being operated in different power consumption modes to provide different levels of performance, has a path computation apparatus configured to select paths for the traffic using the communications apparatus, based on information about traffic load in the network and on information about the power consumption modes of the communications apparatus of at least one of the nodes. A power mode controller is also provided for controlling the power consumption modes of the communications apparatus according to information about traffic load and according to information about the paths selected. By combining of path computation and the control of power consumption modes the overall power consumption of the network can be reduced. A slave power mode controller can be provided.

15 Claims, 16 Drawing Sheets

(51) Int. Cl.
  *H04W 52/02* (2009.01)
  *H04L 12/729* (2013.01)
  *H04L 12/721* (2013.01)
  *G06F 1/32* (2006.01)
  *H04L 29/08* (2006.01)
  *H04W 40/10* (2009.01)

(52) U.S. Cl.
  CPC ............ *H04L 41/12* (2013.01); *H04L 45/125* (2013.01); *H04L 45/127* (2013.01); *H04L 67/1008* (2013.01); *H04L 67/16* (2013.01); *H04W 52/0206* (2013.01); *H04W 40/10* (2013.01); *Y02B 60/50* (2013.01)

(58) Field of Classification Search
  CPC ... H04L 67/1008; H04L 67/16; G06F 1/3206; H04W 52/0206; H04W 40/10; Y02B 60/50
  USPC .................................................. 709/223, 224
  See application file for complete search history.

(56) References Cited

U.S. PATENT DOCUMENTS

| | | | | |
|---|---|---|---|---|
| 2012/0147768 | A1* | 6/2012 | Johnsson | ............ H04L 41/0833 370/252 |
| 2013/0332762 | A1* | 12/2013 | Meirosu | .................. H04L 12/12 713/323 |

OTHER PUBLICATIONS

Claise, B. et al. "Energy Management Framework, draft-ieff-eman-framework-06" Network Working Group Internet Draft, Oct. 21, 2012, IETF Trust, pp. 1-82, XP015088300.

Costa, C. et al. "SustNMS: Towards service oriented policy-based network management for energy-efficiency" 2012 IEEE Sustainable Internet and ICT for Sustainability, Oct. 4, 2012, pp. 1-5, XP032282678, ISBN: 978-1-4673-20131-3.

Preshun, R., Editor "RFC 3416—Version 2 of the Protocol Operations for the Simple Network Management Protocol (SNMP); rfc3416.txt" Dec. 1, 2002, pp. 1-31, XP015009210, ISSN: 0000-0003.

Chandramouli, M. et al. "Power and Energy Monitoring MIB: draft-ietf-eman-energy-monitoring-mib-04.txt" Internet Engineering Task Force Working Draft, Oct. 22, 2012, pp. 1-83, XP015088299.

Parello, B. et al. "Energy Object Context MIB; draft-ieft-eman-energy-aware-mib-05.txt" Internet Engineering Task Force Working Draft, Mar. 13, 2012, pp. 1-44, XP015082015.

Heintz, L. et al. "SNMP Row Operations Extensions' draft-ieft-eos-snmp-rowops-01.txt" Jun. 15, 2001, pp. 1-43, XP015018204, ISSN: 0000-0004.

TMF814 Multi Technology Network Management IDL Solution Set R3.5 "Supporting Document: Equipment Model SD-10, Version 3.1" TeleManagement Forum 2007, pp. 1-8.

TMF814 Multi Technology Network Management IDL Solution Set R3.5 "Supporting Document: Overview of the TMF MTNM NML-EML Interface" SD1-27 Version 31 TeleManagement Forum 2007, pp. 1-8.

TMF513 "Multi-Technology Network Management (MTMN) Business Agreement" Release 3.5, Version 3.2, TeleManagement Forum, Aug. 2008, pp. 1-433 (Part 1 of 2).

TMF513 "Multi-Technology Network Management (MTMN) Business Agreement" Release 3.5, Version 3.2, TeleManagement Forum, Aug. 2008, pp. 434-833 (Part 2 of 2).

PCT International Search Report, dated Jun. 28, 2013, in connection with International Application No. PCT/EP2012/069418, all pages.

International Preliminary Report on Patentability, dated Jan. 14, 2015, in connection with International Application No. PCT/EP2012/069418, all pages.

Ibrahim, A. et al. "Distributed energy-efficient cooperative routing in wireless networks" IEEE Transactions on Wireless Communications, IEEE Service Center, Piscataway, NJ, US, vol. 7, No. 10, Oct. 1, 200, pp. 3930-3941, XP011292845, ISSN: 1536-1276.

Dai, L. et al. "Energy and throughput tradeoff in wireless networks with processing energy considerations" Global Telecommunications Conference, 2005, IEEE St. Louis, MO, USA, Nov. 28-Dec. 2, 2005, pp. 2522-2527, XP010879316, ISBN: 978-0-7803-9414-8.

Le Boudec, J-Y et al. "Rate Performance Objectives of Multihop Wireless Networks" IEEE Transactions on Mobile Computing, IEEE Service Center, Los Alamitos, CA, US, vol. 3, No. 4, Oct. 1, 2004, pp. 334-349, XP011120857, ISSN: 1536-1233.

Claise, B. et al. "Energy Management Framework draft-ietf-eman-framework-05" Internet Draft, Jul. 16, 2012, Network Working Group, pp. 1-60.

Chandramouli, M. et al. "Power and Energy Monitoring MIB draft-eman-energy-monitoring-mib-00" Internet Draft, Aug. 5, 2011, pp. 1-71.

Low Energy COnsumption NETworks ECONET, Large-scale Integrated Project (IP) proposal, ICT Call 5, FP7-1C-2009-5, Version No. 28.2, Oct. 25, 2009, pp. 1-125.

* cited by examiner

FIG 16
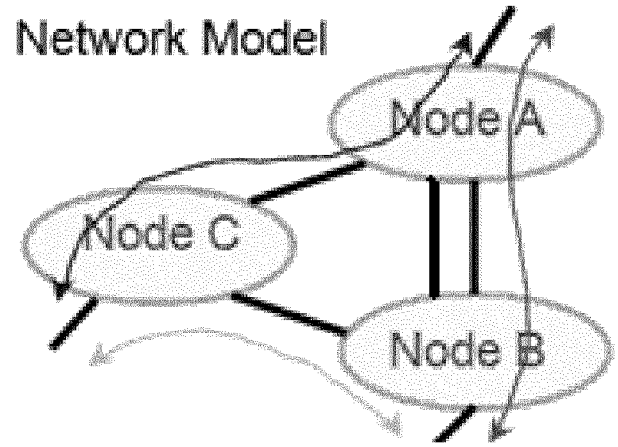
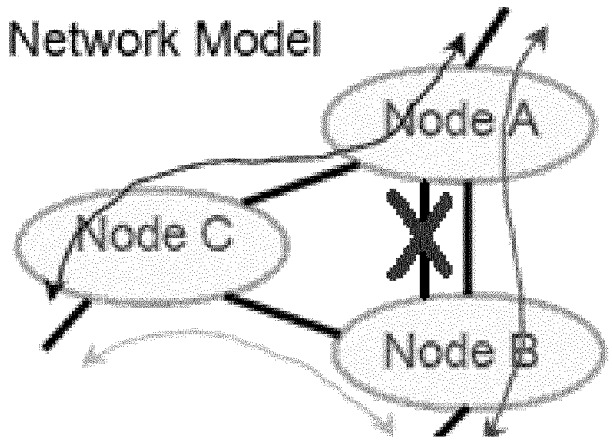
FIG 17
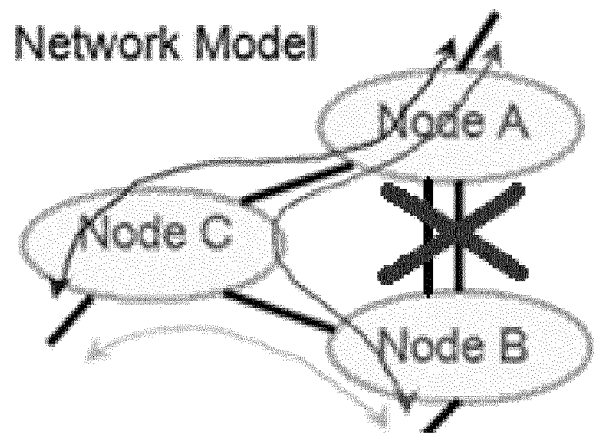
FIG 18

CONTROL OF POWER CONSUMPTION MODES OF COMMUNICATIONS APPARATUS

FIELD

The present invention relates to network management systems for a communications network, to slave power mode controllers for use with network management systems, to controllers for controlling power consumption modes, to corresponding methods of managing communications networks, to corresponding methods of controlling power consumption modes, and to corresponding computer programs.

BACKGROUND

As is explained in the IETF document "draft-ietf-eman-framework-05" network management is currently divided into the five main areas defined in the ISO Telecommunications Management Network model: Fault, Configuration, Accounting, Performance, and Security Management (FCAPS) [X.700]. Absent from this management model is any consideration of Energy Management, which is now becoming more important. Energy Management has particular challenges in that a power distribution network is responsible for the supply of energy to various devices and components, while a separate communication network is typically used to monitor and control the power distribution network.

This EMAN framework document defines a framework for providing Energy Management for devices within or connected to communication networks. The framework describes how to identify, classify and provide context for a device in a communications network from the point of view of Energy Management. The identified device or identified components within a device can then be monitored for Energy Management by obtaining measurements for Power, Energy, Demand and Power Quality. An Energy Object state can be monitored or controlled by providing an interface expressed as one or more Power State Sets.

The IETF EMAN framework also defines a subset of the Management Information Base (MIB) for power and energy monitoring of devices. Among other possible aspects of the generalized power monitoring MIB, it defines also "Power States" in accordance with IEEE1621, DMTF, ACPI and EMAN. The latter attempts to provide a uniform standard to model the different power consumption levels of an equipment. https://datatracker.ietforg/doc/draft-ietf-eman-energy-monitoring-mib/

The Management Information Base (MIB) can be for use in energy management of devices within or connected to communication networks. The MIB modules can provide a model for energy management, including monitoring for power state and energy consumption of networked elements. This MIB takes into account the Energy Management Framework [EMAN-FRAMEWORK], which in turn, is based on the Requirements for Energy Management [EMAN-REQ].

The work leading to aspects of this invention relates to the ECONET project, which has received funding from the European Union Seventh Framework Program (FP7/2007-2013) under grant agreement n° 258454. The Green Abstraction Layer developed by the ECONET consortium is aimed to be a standard and general purpose interface for exposing and controlling the green capabilities and functionalities, which can be realized with different typologies of network equipment and of hardware technologies, towards "general purpose" operations, administration and management frameworks.

SUMMARY

Embodiments of the invention provide improved methods and apparatus. According to a first aspect of the invention, there is provided a network management system for a communications network, the network having nodes comprising communications apparatus capable of being operated in different power consumption modes which provide different levels of performance in passing communications traffic. The network management system has a path computation apparatus configured to select paths for the traffic using the communications apparatus, based on information about traffic load in the network and on information about the power consumption modes of the communications apparatus of at least one of the nodes. There is also a power mode controller coupled to the path computation apparatus for controlling the power consumption modes of at least one of the communications apparatus according to information about traffic load and according to information about the paths selected.

An effect of such combining of path computation and the control of power consumption modes is that the overall power consumption of the network can be reduced for a given amount of traffic compared to known techniques where the communications apparatus control their own power consumption mode by detecting traffic load. More particularly this improvement can arise from any or all of the following: Firstly, such combining enables the power consumption mode control to match changes in traffic more closely and rapidly since it can react to results of path computations rather than waiting for detection of such changes in traffic. Secondly it can enable power consumption mode control for a given communications apparatus to react to traffic over a wider area than merely the traffic that can be detected locally. Thirdly such combining enables the path computation to be biased to use paths which result in lower overall power consumption even if some of the modes need to be changed to achieve this. Furthermore, since the power mode controller can have more traffic information and more timely information, it is likely to be able to identify more quickly when communications apparatus can be put into a lower power mode without undue risk of loss of traffic due to delays in powering up again when there is more traffic. Thus again power can be saved. References to passing traffic are intended to encompass switching or transmitting or receiving or any kind of processing of the traffic. Traffic load is intended to encompass load on the respective communication apparatus, or load on a group of communications apparatus or overall load over the network or any of these according to the context.

Any additional features can be added, or can be disclaimed from the aspects and some such additional features are set out in more detail below. One such additional feature is the path computation apparatus being configured to receive from the communications apparatus, indications of the different levels of performance in passing the traffic for their respective power consumption modes, and to carry out the path computation according to such indications. This can help enable the path computation apparatus to optimise its operation for lower overall power consumption with less of the delays and computational overhead involved in determining the levels of performance from conventional raw information about the power consumption modes. Also it can make it easier for the path computation apparatus to work with many different types of communication apparatus. See FIG. 2 for example.

Another such additional feature is the power mode controller being configured to control the power consumption modes for at least one of the communications apparatus in response to a request from a respective communications apparatus when it detects that its traffic load has reached a traffic threshold. This can help reduce the communications overhead between the controller and the communications apparatus and to enable the communications apparatus to react more quickly without communications delays. Also it can help enable the controller to be scaled to work with many communications apparatus without too much processing and communications resources. See FIG. 3 for example.

Another such additional feature is that for conditions of decreasing traffic load, the network management system is configured such that the path computation apparatus carries out a path computation and the power mode controller is configured to subsequently control the power consumption modes on the basis of the path computation. This can enable better optimisation of overall power consumption as the power consumption mode is controlled based on more up to date information about traffic loads. See FIG. 4 for example.

Another such additional feature is that for conditions of increasing traffic load, the network management system is configured such that the power mode controller controls the power consumption modes and the path computation apparatus is configured to carry out the path computation subsequently on the basis of the power consumption modes. This can enable better optimisation of overall power consumption as the capacity can be increased by controlling the power consumption mode, and the path computation can be based on more up to date information about capacity for the traffic. See FIG. 4 for example Another aspect of the invention provides a slave power mode controller for a communications network, the network having nodes, at least one of the nodes comprising communications apparatus capable of being operated in different power consumption modes which have different levels of performance in passing communications traffic. The slave power mode controller has an interface for communication with the network management system, and a processor coupled to the interface to receive power consumption mode commands from the network management system, and configured to determine power consumption modes for at least one of the communications apparatus based on traffic load and on the received power consumption mode commands. The processor is also configured to output the determined power consumption modes to the respective communications apparatus, and to send to the network management system, information about the power consumption modes of those ones of the communications apparatus. This helps enable corresponding benefits to those of the first aspect, regardless of whether the slave is distributed or centralized or partially distributed and partially centralised. An example of a centralised version is having the slave Power Mode Controller embedded within the NMS. This may be less efficient in terms of higher delay, etc., but the cost reduction may justify it in smaller networks for instance. See FIGS. 5 and 6 for example.

Another such additional feature is the interface being configured to send to the network management system, indications of the different levels of performance in passing the traffic for respective power consumption modes of a respective one of the communications apparatus. This can help enable the network management system to optimise its operation for lower overall power consumption with less of the delays and computational overhead involved in determining the levels of performance from conventional raw information about the power consumption modes. Also it can make it easier for the network to tolerate many different types of communications apparatus. See FIG. 7 for example.

Another such additional feature is the processor being configured to detect when the traffic load for one of the communications apparatus reaches a traffic threshold, and to send a request to the network management system for a command to alter the power consumption mode. This can help reduce the communications overhead between the slave power mode controller and the network management system to enable the slave power mode controller to react more quickly without communications delays. Also it can help enable the controller to be scaled to work with many communications apparatus without too much processing and communications resources. See FIG. 8 for example.

Another such additional feature is the slave power mode controller being configured to set the traffic threshold according to the current power consumption mode. This helps enable reduce the communication overhead between the slave power controller and the network management system, which can reduce costs or improve scalability for example. See FIG. 8 for example.

Another such additional feature is the traffic threshold comprising at least a lower traffic threshold, and/or and upper traffic threshold, and the processor being configured to send a request for a lower power consumption mode when the traffic load reaches that lower traffic threshold, or for a higher power consumption mode when the traffic load reaches that upper traffic threshold. This can help enable the power consumption mode to be reduced more quickly and thus save power. See FIG. 10 for example.

Another aspect of the invention provides a controller for a communications network, the network having nodes, at least one of the nodes comprising communications apparatus capable of being operated in different power consumption modes which have different levels of performance in passing communications traffic. The controller has a processor configured to determine power consumption modes for at least one of the communications apparatus based on traffic load and to output the determined power consumption modes to the respective communications apparatus. An interface to the network management system is provided, the processor being configured to use the interface to send information about the power consumption modes of respective ones of the communications apparatus, wherein this information comprises indications of the different levels of performance in passing the traffic for the respective power consumption modes. This can provide corresponding benefits as set out above. See FIGS. 11 and 12.

Another such additional feature is the interface being configured to send an update of traffic information to the network management system when the traffic load reaches a traffic threshold. This can help enable reduce the communication overhead between the slave power controller and the network management system, which can reduce costs or improve scalability for example. See FIG. 8.

Another such additional feature is at least one of the power consumption modes comprising a definition of selective resetting of a portion of circuitry of a respective communications apparatus, to be carried out when the power consumption mode is changed. This can help reduce delays in waking up from low power modes and can reduce impacts on neighbouring circuitry for example. This can be combined with conventional configuration of clock speeds and supply voltages for example. See FIG. 19 for example.

Another aspect of the invention provides a corresponding method of managing a communications network having steps of selecting paths for the traffic using the communications apparatus, based on information about the traffic in the network and on information about the power consumption modes of the communications apparatus, and controlling the power consumption modes of at least one of the communications apparatus according to information about the traffic and information about the paths selected for the traffic. This can provide corresponding benefits as set out above.

Another aspect of the invention provides a corresponding method of controlling power consumption modes in a communications network, having steps of receiving power consumption mode commands from the network management system, determining power consumption modes for at least one of the communications apparatus based on traffic load and on the received power consumption mode commands, and outputting the determined power consumption modes to the respective communications apparatus. There is also a step of sending to the network management system, information about the power consumption modes of those ones of the communications apparatus. This can provide corresponding benefits as set out above.

Another aspect of the invention provides a corresponding method of controlling power consumption modes in a communications network having steps of determining power consumption modes for at least one of the communications apparatus based on traffic load, outputting the determined power consumption modes to the respective communications apparatus, and sending to the network management system information about the power consumption modes of respective ones of the communications apparatus. The information sent to the network management system comprises indications of the different levels of performance in passing the traffic for their respective power consumption modes. This can provide corresponding benefits as set out above.

Another aspect of the invention provides a computer program on a computer readable medium and having instructions which when executed by a computer, cause the computer to carry out any of the above methods Any of the additional features can be combined together and combined with any of the aspects. Other effects and consequences will be apparent to those skilled in the art, especially over compared to other prior art. Numerous variations and modifications can be made without departing from the claims of the present invention. Therefore, it should be clearly understood that the form of the present invention is illustrative only and is not intended to limit the scope of the present invention.

BRIEF DESCRIPTION OF THE DRAWINGS

How the present invention may be put into effect will now be described by way of example with reference to the appended drawings, in which:

FIGS. 16 to 18 show a portion of a network with traffic flows at different times showing routing coordinated with to provide power consumption mode control.

DETAILED DESCRIPTION

Figure 1:
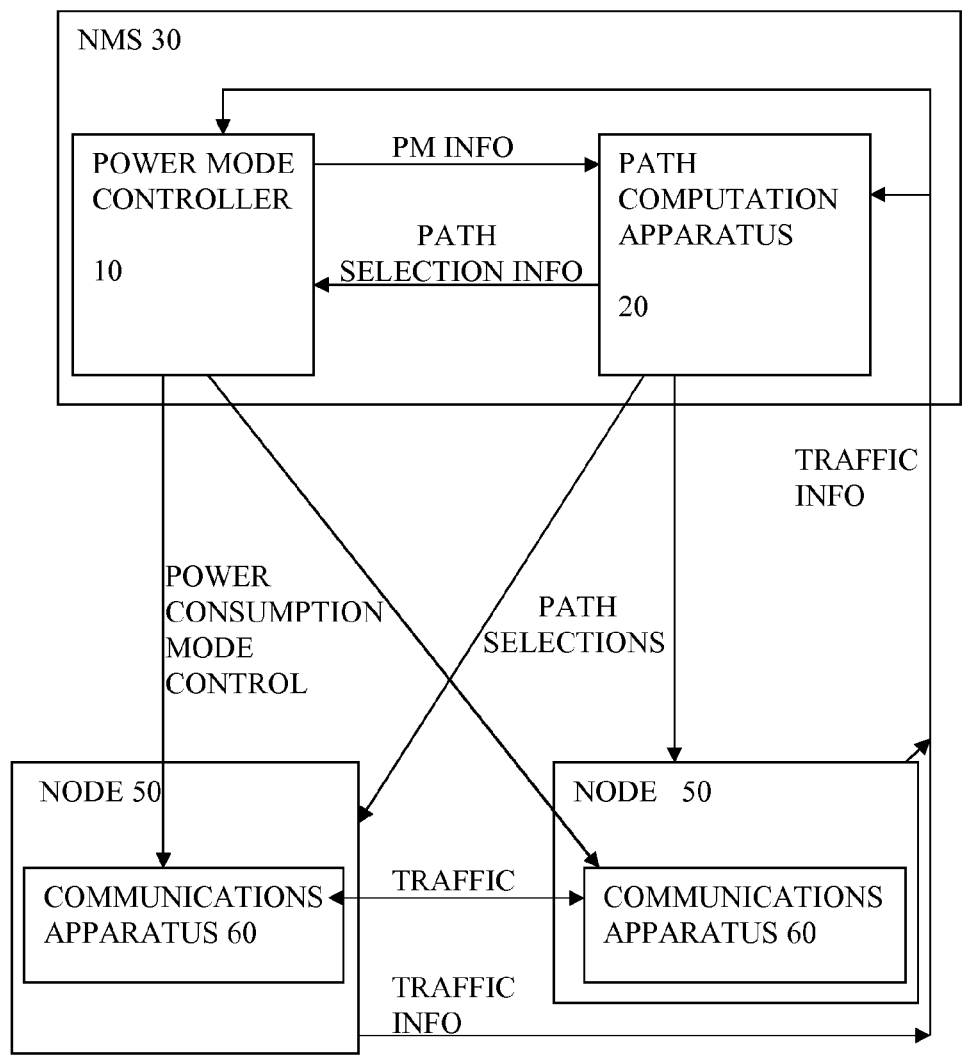
FIG. 1 shows a schematic view of an NMS according to an embodiment of the present invention having PM control and path computation.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn to scale for illustrative purposes.

Abbreviations

ACPI Advanced Configuration and Power Interface Specification
DMTF Desktop Management Task Force
BPM Board Power Management
EA NMS—Energy Aware NMS
EMAN Energy MANagement
EPIC Electro-Optical ICs
Eth Ethernet
GHG—Green House Gas emissions
IP Internet Protocol
MIB Management Information Base
NMS Network Management System
OPEX—Operational Expenditure
OTN Optical Transport Network
PLL—Phase Locked Loop
PM Power mode PMM—Power Management Mode
PoE Power over Ethernet
QoS Quality of Service
SDH Synchronous Digital Hierarchy
WDM Wavelength Division Multiplexing Definitions Where the term "comprising" is used in the present description and claims, it does not exclude other elements or steps and should not be interpreted as being restricted to the means listed thereafter. Where an indefinite or definite article is used when referring to a singular noun e.g. "a" or "an", "the", this includes a plural of that noun unless something else is specifically stated.

Elements or parts of the described nodes or networks may comprise logic encoded in media for performing any kind of information processing. Logic may comprise software encoded in a disk or other computer-readable medium and/or instructions encoded in an application specific integrated circuit (ASIC), field programmable gate array (FPGA), or other processor or hardware.

References to nodes can encompass any kind of node, not limited to the types described, not limited to any level of integration, or size or bandwidth or bit rate and so on. They can encompass switching nodes or endpoints and may be incorporated in equipment having other functions, such as household goods, multimedia devices, vehicles, or factory equipment for example.

References to links are intended to encompass any kind of links, not limited to wired or wireless, not limited those of any particular protocol or frequency of operation, or technology or type of multiplexing.

References to communications apparatus can include any kind of such apparatus for example but not limited to: routers, switches, endpoints such as Power over Ethernet (PoE) endpoints, protocol gateways for building management systems, intelligent meters, home energy gateways, hosts and servers, sensor proxies, etc.

References to software can encompass any type of programs in any language executable directly or indirectly on processing hardware.

References to processors, hardware, processing hardware or circuitry can encompass any kind of logic or analog circuitry, integrated to any degree, and not limited to general purpose processors, digital signal processors, ASICs, FPGAs, discrete components or logic and so on. References to a processor are intended to encompass implementations using multiple processors which may be integrated together, or co-located in the same node or distributed at different locations for example.

Introduction

By way of introduction to the embodiments, how they address some issues with conventional designs will be explained. Although traffic load varies over time, existing Telecom equipments always provide maximum performance, and hence maximum consumption, even during low load. Until now, telecom equipments have been designed so that they are always running at full power, even if the traffic load varies.

Introduction to Features of Embodiments

The energy consumption decreasing technique herein proposed is based on improvements in hardware, in firmware and in software. Some notable points which will be described in more detail are:

Providing telecoms apparatus which has power consumption modes to enable it to change its power consumption under externally controlled defined power modes;

Defining power modes as a set of functionality enabled/disabled on the apparatus;

Defining an Energy Aware control plane, able to modify apparatus power consumption by setting its power mode as a function of traffic load; and Providing traffic routing that is power consumption aware and capable of minimizing overall power consumption at a network level.

Power Modes (also referred to as power consumption modes or power management modes) such as low power, fast sleeping, stand-by, etc. are incorporated into the basic design, and adaptation of the performances (and hence of power consumption) can be carried out according to the actual traffic load level. By means of the methods herein described, there can be more energy efficient Telecom operation by dynamic performance and consumption adaptation to any arbitrary traffic load situation, for example as a function of day-time, of specific area service (e.g. vacation villages area, business area), and so on.

Embodiments are related to power-saving methods providing effective capability to lower the performances of lightly utilized communications apparatus to save the power consumed, by introducing novel energy management capabilities, which can include multiple low power modes, idle and stand-by logic states, to dynamically adapt performances and therefore power consumption to actual traffic load.

To this end, there are explained techniques, mechanisms and control criteria suitable for various types of communications apparatus in the form of any telecom network element (transport, access, wireless, routers, etc.), enabling energy saving by dynamically adapting network capacities and resources to current traffic loads and user requirements, while ensuring end-to-end Quality of Service.

Power Consumption Modes

Typically some of the most important factors in determining power consumption in any design are the system Clock Speed and the system Supply Voltage. Switching power dissipated by a device, i.e. the dynamic power consumption expression is:

$$P = C V^2 f$$

Dynamic power dissipation is proportional to the square of operating voltage and linearly proportional to operating frequency and load capacitance. Therefore by lowering clock frequency, dynamic power dissipation decreases linearly, and by reducing supply voltage, an exponential lowering can be obtained.

Note: whole Power Consumption of a given device is expressed by $P = C V^2 f + V I_{static}$ where $I_{static}$ is static (e.g. leakage) current. The reduction of the static current is a mere technological step achievable for instance by shrinking die (e.g. from 45 nm to 28 nm, etc.) or, when applicable, by other technological improvements such as Electro-Optical ICs (EPICs) introduction. Note: less power consumption means less heat output, allowing the cooling fans to be throttled down or turned off, reducing noise levels and further decreasing whole system power consumption.

Power Modes can be applied by means of actual Traffic Load measurement, then retrieving the information for slowing-down resources or even shutting-down unnecessary resources when possible, under the control of an Energy Aware Control Layer.

Multiple levels of Power Modes can be envisaged such as Full Power/Full Performances, Medium Power/Medium Performances, Low Power/Reduced Performances, Fast Sleeping, Deep Sleeping, Standby, Off, each characterized by an additional power saving but also by reduced performances and increased wake up time.

Power Consumption Modes Examples

Power Consumption Modes definition, terms and granularity may depend on the product type. Any of the following described modes can apply at System, at Card, as well as at single Circuit Portion level (e.g. a given interface, engine, etc.) and some of them can be extended: for instance multiple Low-Power modes can be possible, according to the given circuitry. The number and types of modes can be a function of the traffic load, potential power saving, and wake-up promptness. Two main categories can be identified: Operational Modes and Sleeping Modes.

Operational Modes

Operational (or On) Modes are states in which the device completely or partially performs its intended duties. On-Modes Power Management can be categorized by at least three terms:

- On-Maximum: Operational state with all options applied (e.g. maximum clock speed, max supply voltages, all ancillary functions on such as e.g. external synch, etc.).
- On-Normal: Operation state with a configuration such that maximum traffic load is achieved but some ancillary function e.g. external synch is off.
- On-Low Power: Operational state with reduced traffic load capability (e.g. reduced supply voltage, clock, memory banks, etc.). May be possible to set several On-Low Power Modes, as an example: 9 Gbps, 8 Gbps, . . . 1 Gbps, etc.

Sleeping Modes

Sleeping Modes are states in which the equipment, the card or the circuit portion is not operative, i.e. cannot perform either completely or partially its intended duties. It is ready to resume an Operational Mode, within a given "wake-up" time, through the use of remote control or another signal (e.g. local receivers or tails detects some traffic) according to the sleeping mode and implementation. According to power saving and wake-up promptness, Sleeping Modes may be:

- Fast Sleep: no traffic can run, but most of circuitry is active, such as receivers are listening for traffic while transmitters are off, and/or SW/HW reset is applied to part/whole circuitry. This mode is stacked just below the lowest of the On-Low Power modes.
- Deep Sleep: most circuitry is inactive, such as both receivers and transmitters are off, and/or HW/SW reset is applied to part/whole circuitry. Moreover reduced or null $V_{dd}$ may apply to some parts of circuitry.
- Stand-by (or Soft-Off): major equipment parts are switched off via remote control or command, but some minimal circuit is still on (i.e. a sort of heart-beating mode, where for instance just a µP is running)
- Power-Off Mode (or Hard-Off): Power-off mode has almost null power consumption when the device is connected to an electrical supply. Power-Off mode may apply $V_{dd}$ off at the whole card by remote control, but some very minimal residual power may be required to supply electronic switches.

Energy Aware NMS

This method makes use of an Energy Aware management entity capable of minimizing P_active, and maximizing Low Power Modes adoption without jeopardizing network performances and QoS, by means of smart management policy, controlling entering and exiting the PMM states.

Energy Aware management policy shall implement energy aware routing protocols to maximize saving opportunities by filling as much as possible certain communication resources so to put in Low-Power or Sleeping Modes as much as possible of remaining resources.

At Node or Network level, the Energy Aware NMS can compute the optimal Traffic Routing and Power Management Mode for each device under control.

For optimal working of an Energy Aware Network, the Energy Aware Network Management System can take control over traffic by routing it by an energy aware perspective, by identifying any alternative path, and by controlling the entering and exiting of the various power consumption modes of the energy aware equipments under control. For this purpose the EA NMS should know the Network Topology and the Actual Traffic Load, as well as for example data throughput, transition time, latency and power consumption of each power management state of each EA equipment under control, in order to maximize power saving without affecting the QoS. For instance, by knowing how long it takes to get in and out a certain sleeping modes, it will do so to make traffic routing at the right timing without jeopardizing QoS.

FIG. 1 Embodiment with PM Control and Path Computation

FIG. 1 shows a schematic view of a network according to an embodiment. An NMS 30 has amongst others, a power mode controller 10 and a path computation apparatus 20. These can be implemented as software functions running on a server or any kind of processor for example. The network has nodes 50 which have communications apparatus 60 for handling the communications traffic in the network. The communications apparatus can be for example systems, or cards or circuits which can be capable of being operated in different power consumption modes which provide different levels of performance in passing the communications traffic. The power consumption modes can be power states in accordance with IEEE1621, DMTF, ACPI or EMAN or any other kind of power consumption mode. The nodes can be dedicated to the network, or may be incorporated in equipment having other functions, such as household goods, vehicles, or factory equipment for example.

The power mode controller is coupled to receive path selection information from the path computation apparatus, and to receive traffic information such as traffic loads, from the nodes 50 of the network. The path mode controller is arranged to output control signals to the communications apparatus to control its power consumption mode. This control can be carried out based on information about traffic load and according to information about the paths selected. The path selection apparatus is coupled to receive traffic load information from the communication apparatus and to receive information about power consumption modes of the communications equipment from the power mode controller. The path selections for new traffic demands can then be made by the path computation apparatus based on the traffic load information and on information about the power consumption modes of the communications apparatus. The path selection can use any type of path selection algorithm, adapted to make use of the power consumption mode information, and an example is described in more detail below. As discussed above, by combining path computation and the control of power consumption modes, the overall power consumption of the network can be reduced for a given amount of traffic compared to known techniques where the communications apparatus control their own power consumption mode by detecting their own traffic load.

Figure 2:
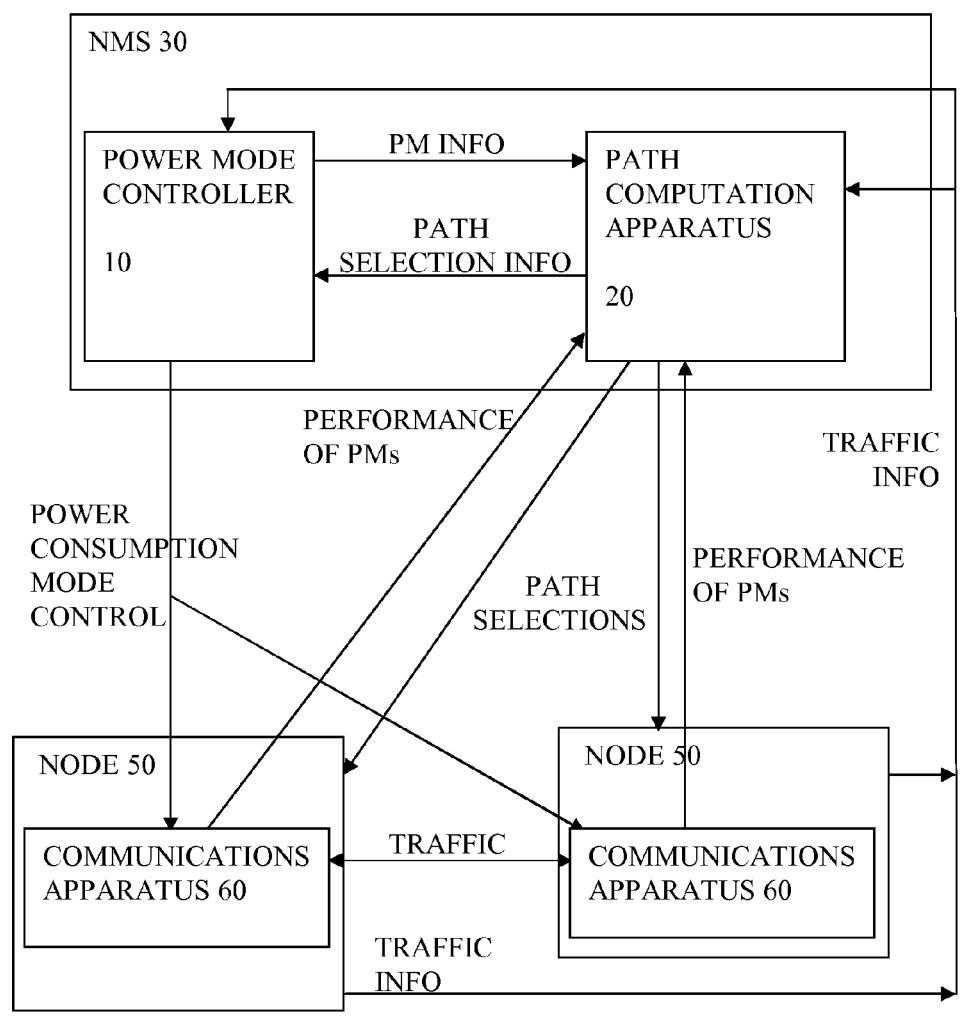
FIG. 2 shows a schematic view of an embodiment which makes use of performance information.

FIG. 2 shows a similar embodiment to that of FIG. 1, but in this case the path computation apparatus additionally receives information about different levels of performance in passing traffic, for the different power consumption modes of any of the communications apparatus. This performance information could in some cases be derived by the path computation apparatus from raw information about the power consumption mode, but at some cost in computational overhead and delay. Also, by providing the path computation apparatus with such performance information, the path computation can be more independent of the types of communication apparatus in use, and this can make it easier for managing larger networks with many different types and versions of communications apparatus.

Figure 3:
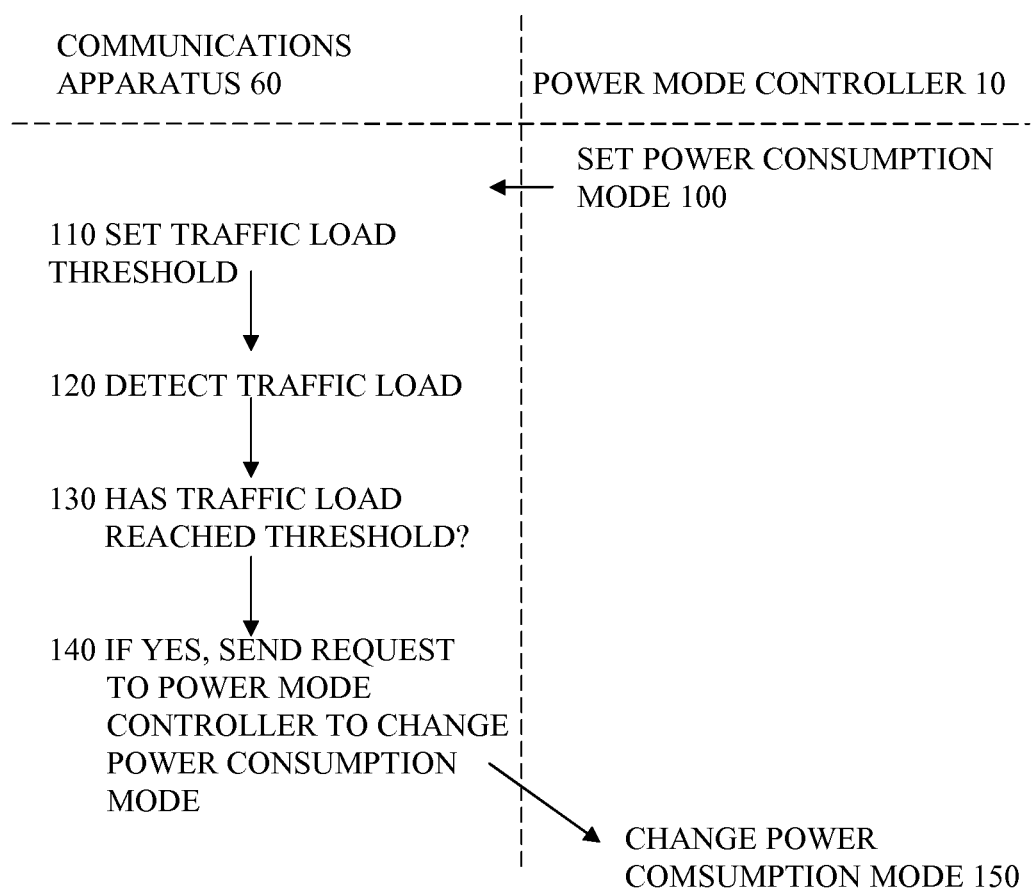
FIG. 3 shows a time chart showing steps using threshold based requests according to an embodiment.

FIG. 3, Threshold Based Requests for PM Change

FIG. 3 shows a time chart of some additional steps in operating a network according to an embodiment, such as the embodiment of FIG. 1 or 2 or other embodiments. This is to illustrate the additional feature of changing power consumption mode based on requests from the communication apparatus when it detects its traffic load has reached a threshold. In FIG. 3 the left hand column shows actions of a communications apparatus and the right hand column shows actions of the power mode controller 10. Time flows downwards.

The power mode controller sets an initial power mode at step 100. At step 110, the communications apparatus sets a traffic load threshold. At step 120 the traffic load is detected at the communications apparatus, and compared to the threshold at step 130. If it has reached the threshold, then at step 140 a request is sent to the power mode controller to change the power consumption mode. At step 150 the power mode controller responds by changing the power consumption mode. In principle the threshold can be an upper or a lower limit, in some cases there will be two thresholds to provide upper and lower limits. There can be different thresholds for each of the different power consumption modes.

By detecting at the communications apparatus that the traffic load has reached a traffic threshold, this can relieve the power mode controller from regular polling and thus help reduce the communications overhead between the controller and the communications apparatus, and reduce the computational overhead at the controller. It can enable the communications apparatus to react more quickly without the latency and communications delays involved in polling. Also it can help enable the controller to be scaled to work with many communications apparatus without too much processing and communications resources.

Figure 4:
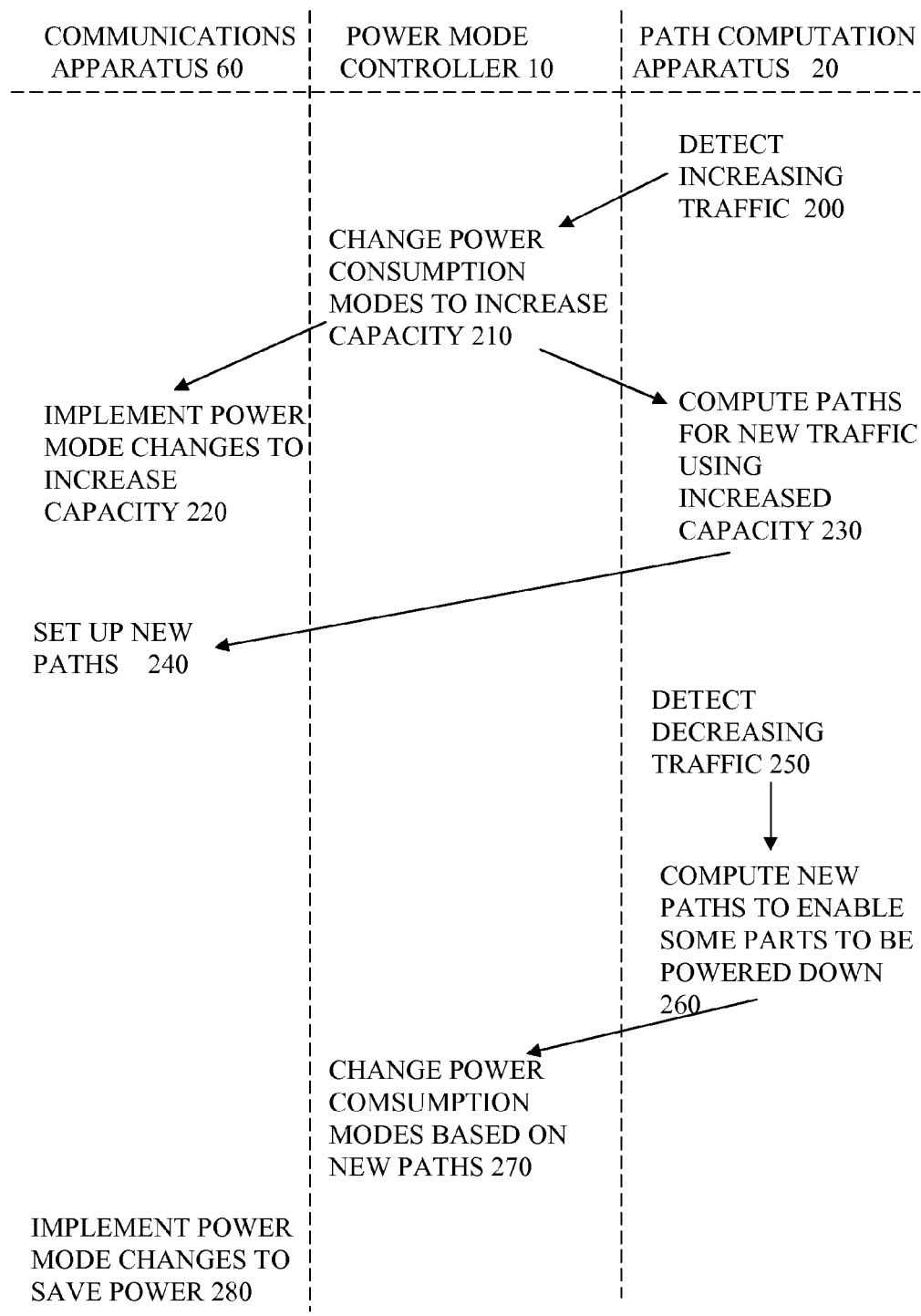
FIG. 4 shows a time chart for another embodiment showing different ordering of steps for increasing or decreasing traffic.

FIG. 4, Ordering of Path Computation and PM Control

FIG. 4 shows a time chart for another embodiment, to show an example of the additional feature of deciding the order in which steps of path computation and power consumption mode control are made, depending on whether traffic load is increasing or decreasing. This can be added to the embodiment of FIG. 1 or 2 or any other embodiment. In FIG. 4 the left hand column shows actions of a communications apparatus, the central column shows actions of the power mode controller 10, and the right hand column shows actions of the path computation apparatus. Time flows downwards.

At step 200 the increasing overall traffic load is detected by the path computation apparatus to be sufficient to need additional capacity. This information is passed to the power mode controller which changes power consumption modes of selected communications apparatus to increase performance and thus provide more capacity. At step 220, these changes are implemented at the respective communications apparatus. Then the path computation apparatus computes new paths for new traffic demands using the increased capacity at step 230. These new paths are set up at step 240 using the communications apparatus. Some time later, there is detection at step 250 of decreasing traffic load overall, sufficient that there is scope for saving power consumption by changing power consumption modes. Now there is a different order of steps. At step 260 the path computation is carried out first, to see if traffic can be rerouted to enable some parts to be powered down. Then at step 270 the power consumption mode control is carried out based on the rerouted traffic, so that some communications apparatus can be powered down to a lower power mode. These power mode changes are implemented at step 280 at the apparatus to reduce the overall power consumption. In some cases traffic can be concentrated to use fewer communications apparatus, which may involve increasing the power consumed by some apparatus, which is still useful if it enables an overall reduction in power consumption by the network. This is enabled by the cooperation between the power consumption mode controller and the path computation apparatus set out above.

FIGS. 5-9, Slave Mode Power Controller Examples

Figure 5:
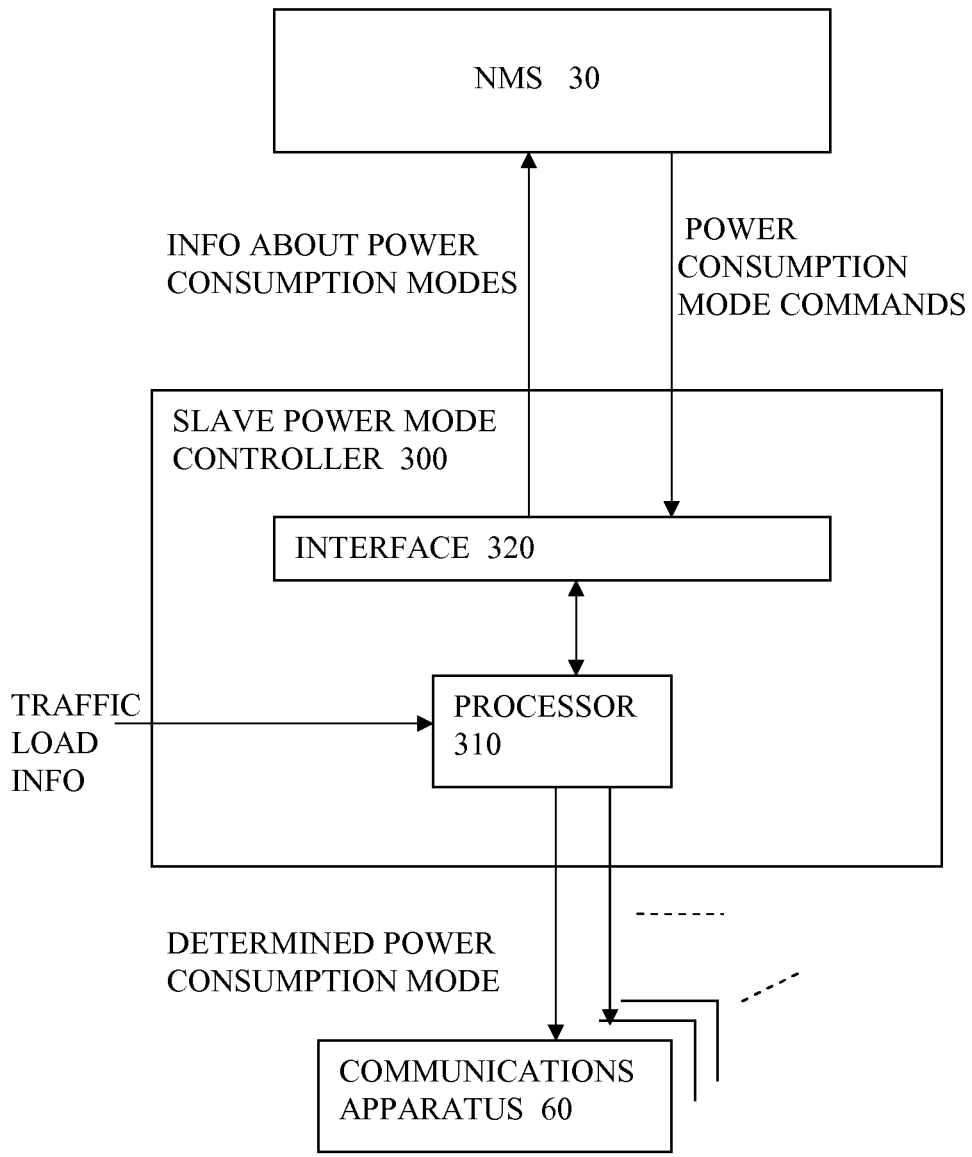
FIG. 5 shows a schematic view of a network according to an embodiment, to show an example of a slave power mode controller.

FIG. 5 shows a schematic view of a network according to an embodiment, to show an example of a slave power mode controller. The slave power mode controller is shown coupled in between the NMS 30 and the communications apparatus 60. It has an interface 320 for communication with the NMS 30, and a processor 310 coupled to the interface to receive power consumption mode commands from the NMS, and configured to determine power consumption modes for at least one of the communications apparatus based on traffic load and on the received power consumption mode commands. The slave power controller is also arranged to output the determined power consumption modes to the respective communications apparatus. Information about the power consumption modes of respective ones of the communications apparatus are sent to the NMS. As discussed above, by combining the control of power consumption modes with operations of the NMS, the overall power consumption of the network can be reduced for a given amount of traffic compared to known techniques where the communications apparatus control their own power consumption mode by detecting their own traffic load. The NMS has a wider view of the network traffic load, and of power consumption modes of communication apparatus across the network and so can help enable overall power consumption to be reduced.

Figure 6:
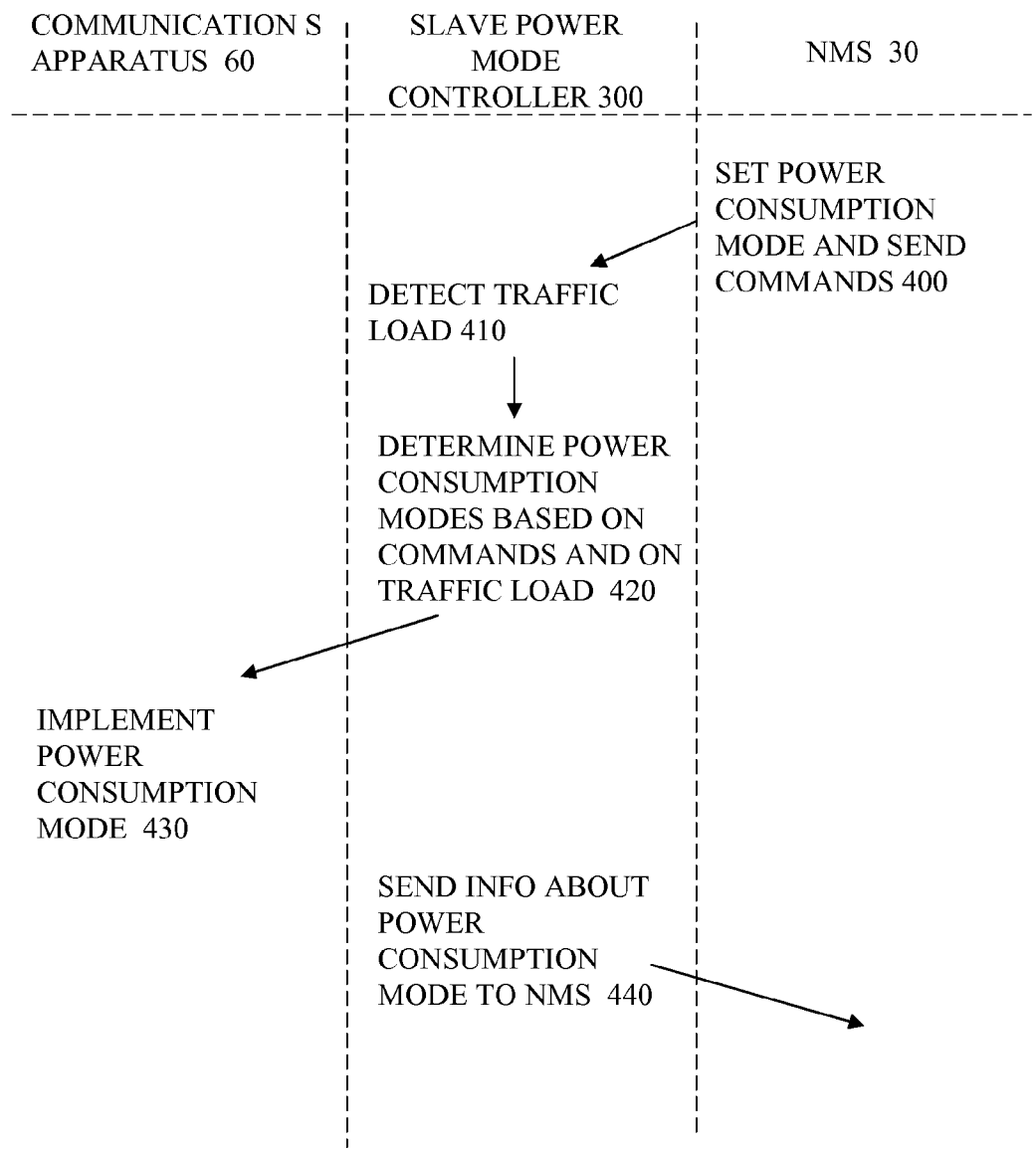
FIG. 6 shows a time chart showing steps for an embodiment corresponding to that of FIG. 5.

FIG. 6 shows a time chart for an embodiment corresponding to FIG. 5 to show the operation of a slave power mode controller. The left column shows operations of the communications apparatus, the central column shows the operations of the slave power mode controller, and the right column shows the actions of the NMS. Time flows downwards. At step 400 the NMS sets power consumption modes and sends commands to the slave power mode controller. At step 410 the slave power mode detects traffic loads, and determines power consumption modes based on commands and on traffic loads. The slave power mode controller can be responsible for one or for many communications apparatus, if for many, the traffic load may be determined for individual apparatus, or for a group of apparatus. The traffic load may be determined at the apparatus and sent to the slave power mode controller. The decided power consumption mode is implemented at the communications apparatus at step 430.

The slave power mode controller can then update the NMS by sending the information about power consumption mode to the NMS, at step 440. The NMS can make use of this information either as an input to help decide on power consumption modes for other communications apparatus, or as an input to other NMS functions such as path computation for example, or for any other use.

Figure 7:
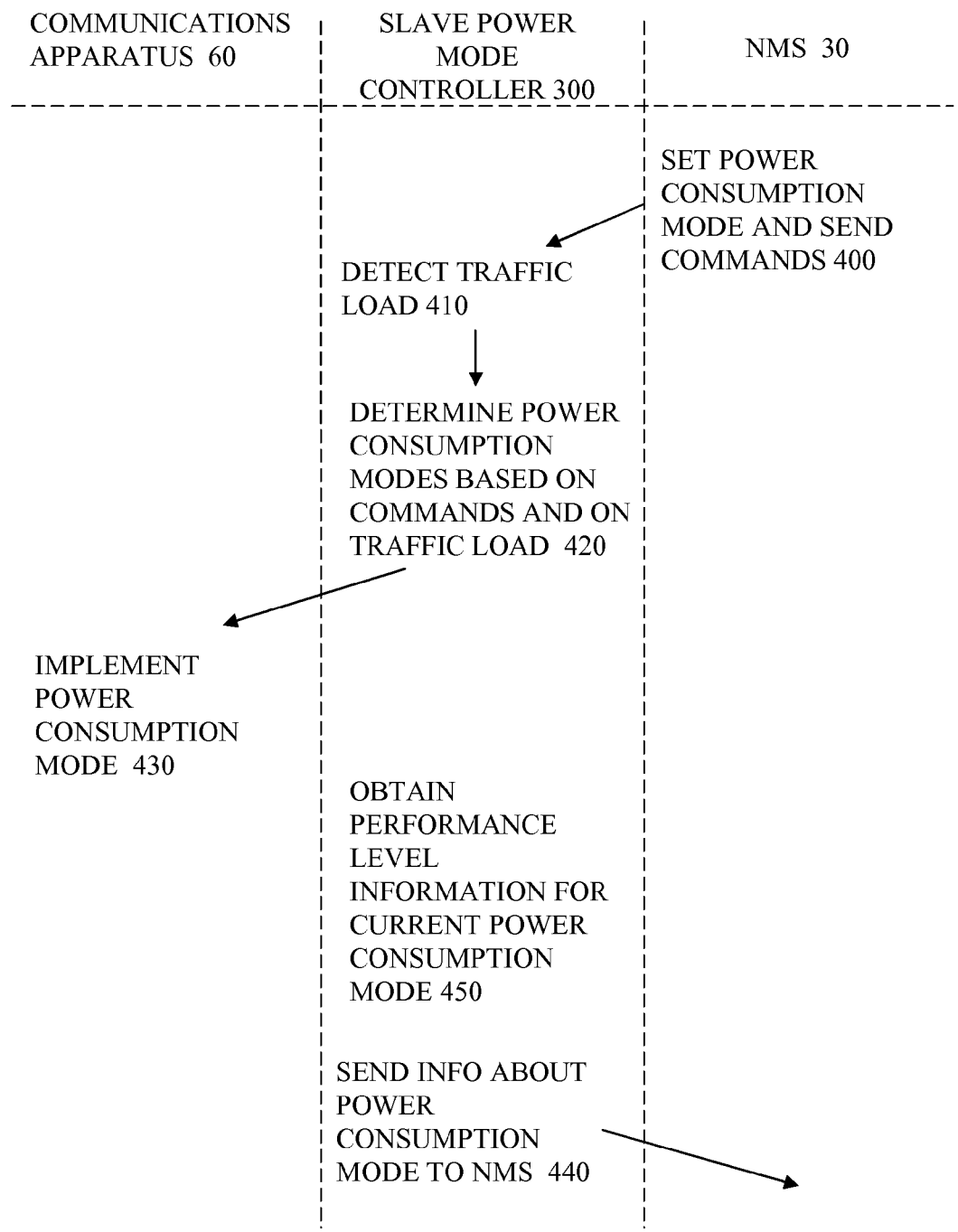
FIG. 7 shows another time chart to show the additional feature of obtaining performance level information for sending to the NMS according to an embodiment.

FIG. 7 shows another time chart to show the additional feature of obtaining performance level information for sending to the NMS. The left column shows operations of the communications apparatus, the central column shows the operations of the slave power mode controller, and the right column shows the actions of the NMS. Time flows downwards. Steps 400 to 430 are similar to those shown in FIG. 6. Before the slave power mode controller updates the NMS by sending the information about power consumption mode to the NMS, at step 450, the slave power mode controller obtains performance level information for the current power consumption mode. This can be sent as part of the information about power consumption mode, to the NMS at step 440. This can help enable the NMS to optimise its operation for lower overall power consumption with less of the delays and computational overhead involved in determining the levels of performance from conventional raw information about the power consumption modes. Also it can make it easier for the network to tolerate many different types of communications apparatus. The NMS can thus be made more independent of the types of communication apparatus in use, and this can make it easier for managing larger networks with many different types and versions of communications apparatus.

Figure 8:
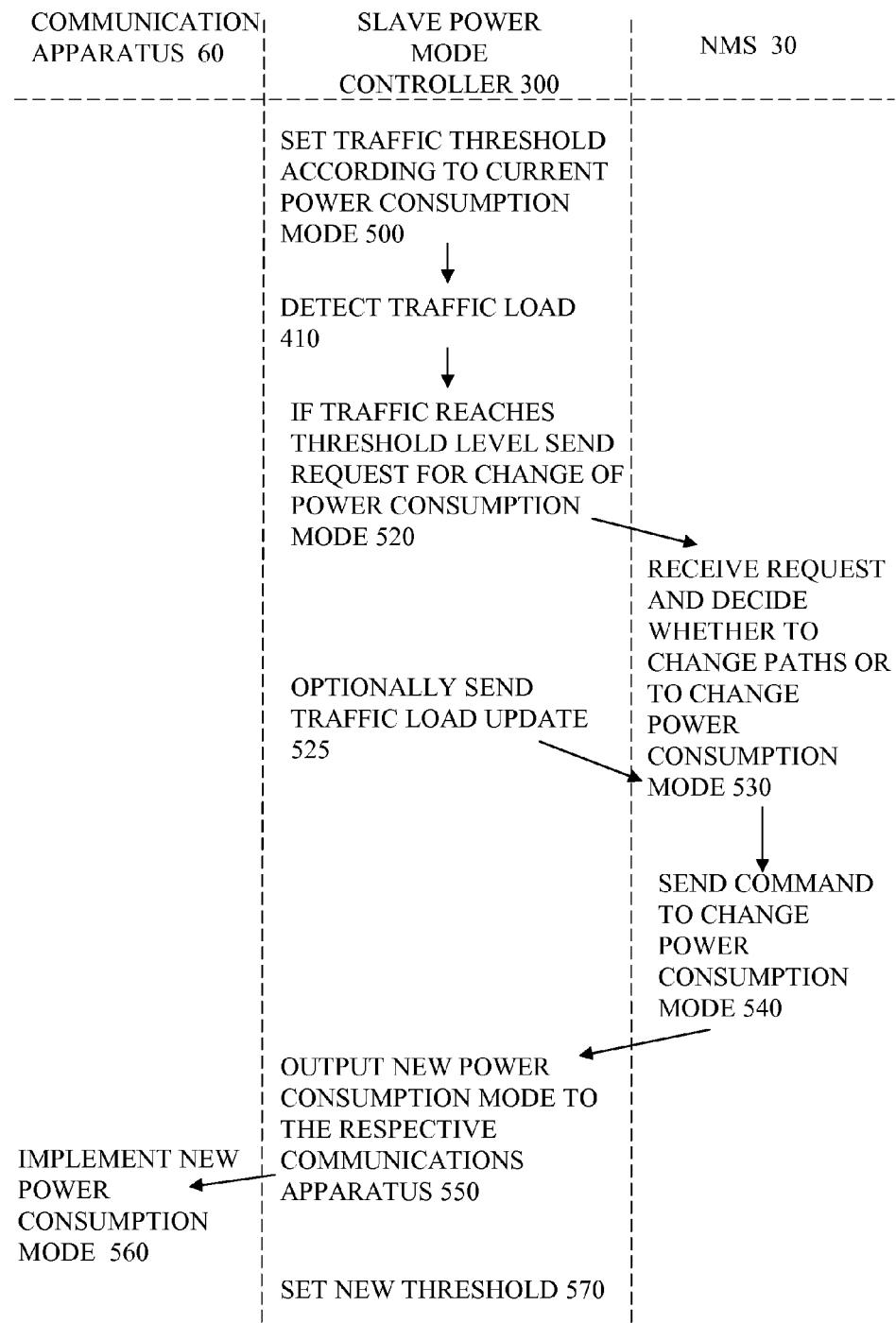
FIG. 8 shows another time chart to show controlling power consumption mode based on requests from the slave power mode controller based on traffic load thresholds.

FIG. 8 shows another time chart to show the additional feature of controlling power consumption mode based on requests from the slave power mode controller when it detects its traffic load has reached a threshold. The left column shows operations of the communications apparatus, the central column shows the operations of the slave power mode controller, and the right column shows the actions of the NMS. Time flows downwards.

At step 500, the slave power mode controller sets a traffic threshold according to a current power consumption mode, at a level so that the slave power mode controller can trigger a change in power consumption mode when the traffic load reaches a suitable level. As discussed above there may be upper and lower thresholds. At step 410 traffic load is detected by the slave power mode controller, the traffic load being for the respective communications apparatus, or for a group of apparatus, and may be detected at the apparatus and sent to the slave power mode controller. At step 520 the traffic load is compared to the threshold, and if it has reached the threshold, then a request for a change of power consumption mode is sent.

At step 530 the request is received and it is decided whether to change paths or to change power consumption mode. If it is decided to change power consumption mode then a command for such a change is sent to the slave power mode controller at step 540. The new power consumption mode is sent to the respective communication apparatus at step 550, and received and implemented in the communications apparatus at step 560.

There is an optional step 525 of sending a traffic load update to the NMS periodically after the traffic load has been detected, or in some embodiments only if the threshold is reached, so as to reduce the communications and processing overhead. There is a step 570 of setting a new threshold after the power consumption mode has been changed.

Figure 9:
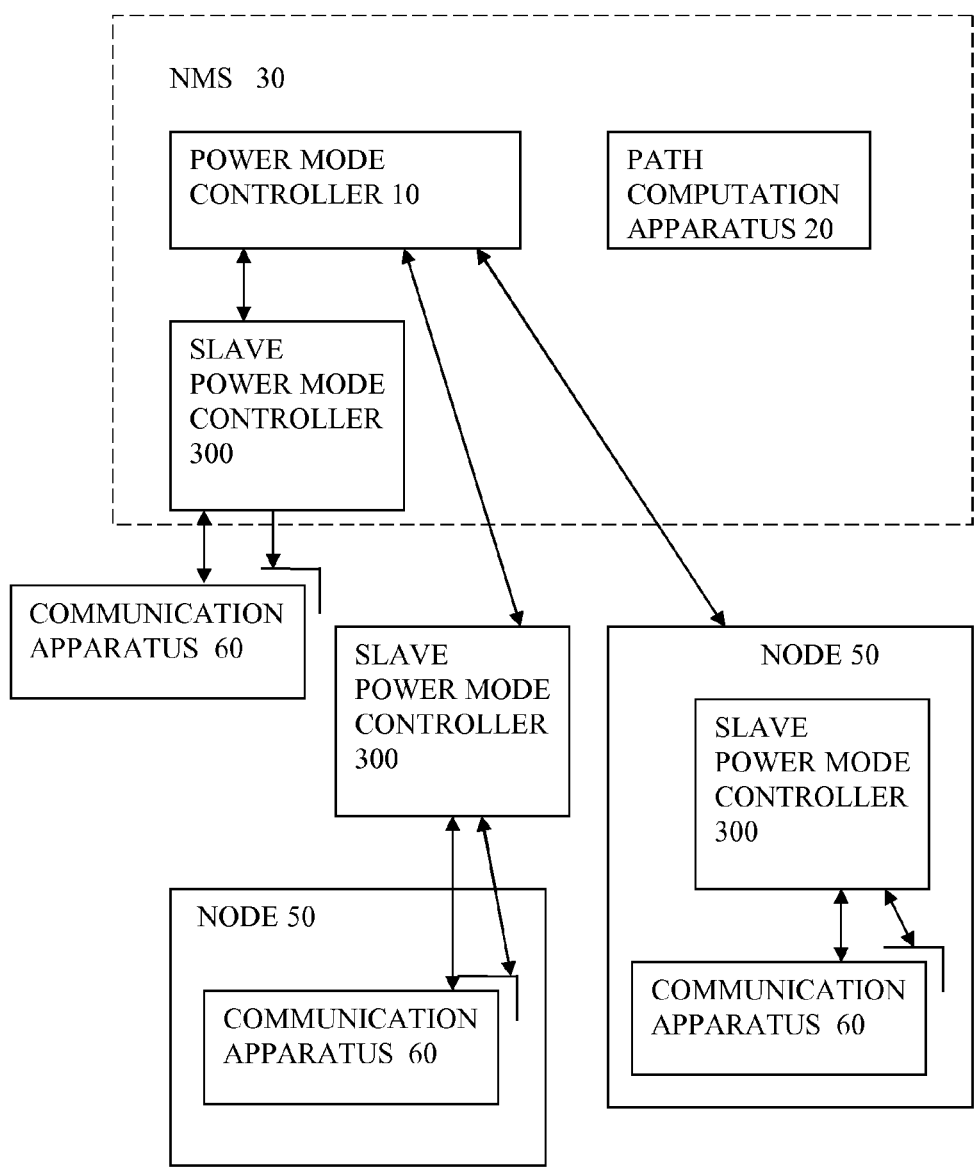
FIG. 9 shows a schematic view of a network according to an embodiment, to show various examples of locations of the slave power mode controller.

FIG. 9 shows a schematic view of a network according to an embodiment, to show various examples of locations of the slave power mode controller. There are three different locations, and in different examples the slave mode controllers may be placed at only one of these or any of two or three of the locations shown. The left-most of the slave power mode controllers is shown coupled in between the NMS 30 and the communications apparatus 60, but is located at or in the NMS. The central of the slave power mode controllers is shown coupled in between the NMS 30 and the communications apparatus 60, and located at its own intermediate location away from the NMS and from the nodes 50 having the communications apparatus. The right-most of the slave power mode controllers is shown coupled in between the NMS 30 and the communications apparatus 60, and located at or in the node 50 having the respective communication apparatus.

Figure 10:
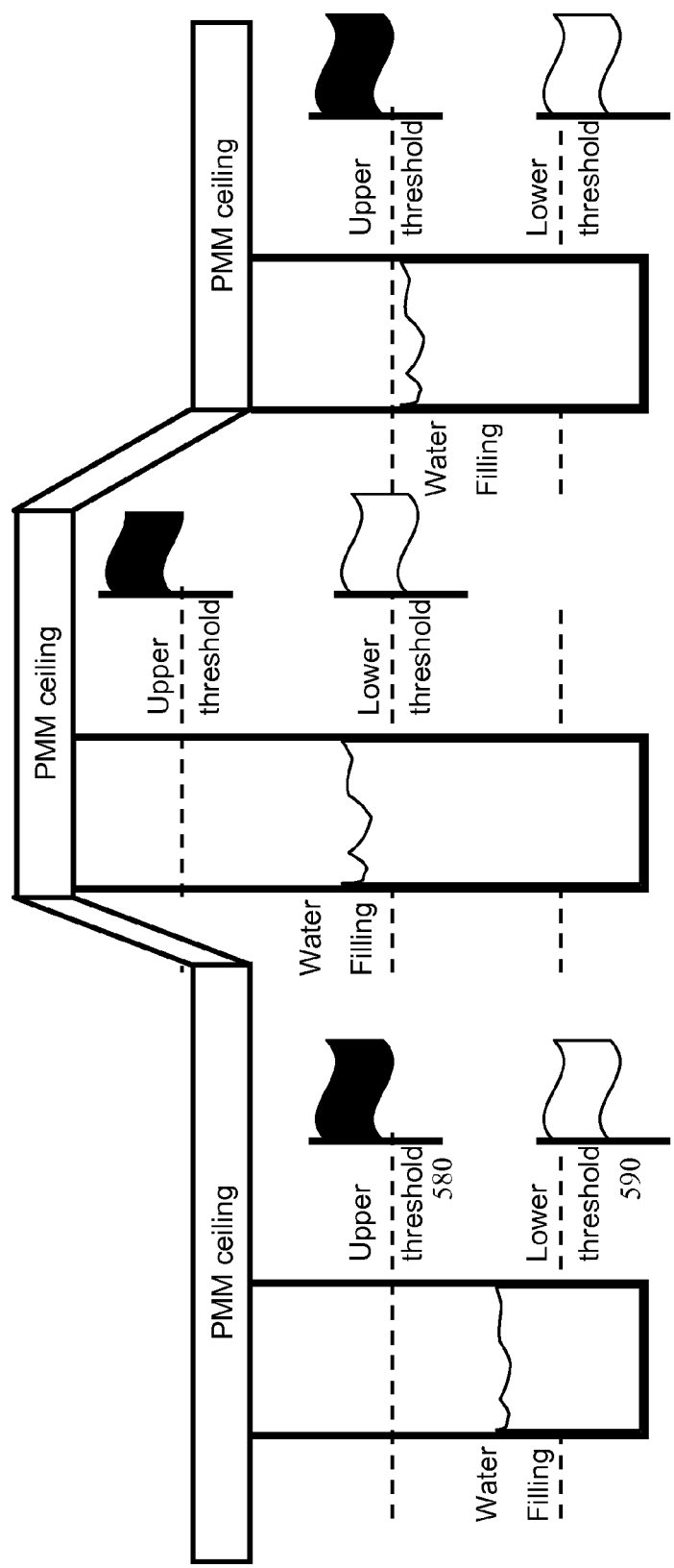
FIG. 10 shows a time chart of how traffic load thresholds can vary over time according to embodiments.

FIG. 10, Thresholds Varying over Time

FIG. 10 shows a graph of traffic load and thresholds varying over time as time flows from left to right. The traffic load is shown represented as a bucket with a water filling level at three different time instants. At a first time instant the load is between an upper threshold 580 (shown by a dark flag) and a lower threshold 590 (shown by a light flag). The top of the bucket is the Power mode (PMM) ceiling indicating the maximum performance in terms of traffic load capacity. The upper threshold is a little below the ceiling so that there is some margin to allow time for the controller or NMS to take action. At a second time instant, the traffic load has increased sufficient to cause a request to increase the capacity to be triggered. In response the power consumption mode has been changed as shown by the increased ceiling. The upper and lower thresholds have also been changed to be higher than before.

At the third instant the traffic load has decreased so a request to decrease the power consumption mode has been sent and the mode has been changed, shown by the lower PMM ceiling, and the lowered upper and lower thresholds.

Figure 11:
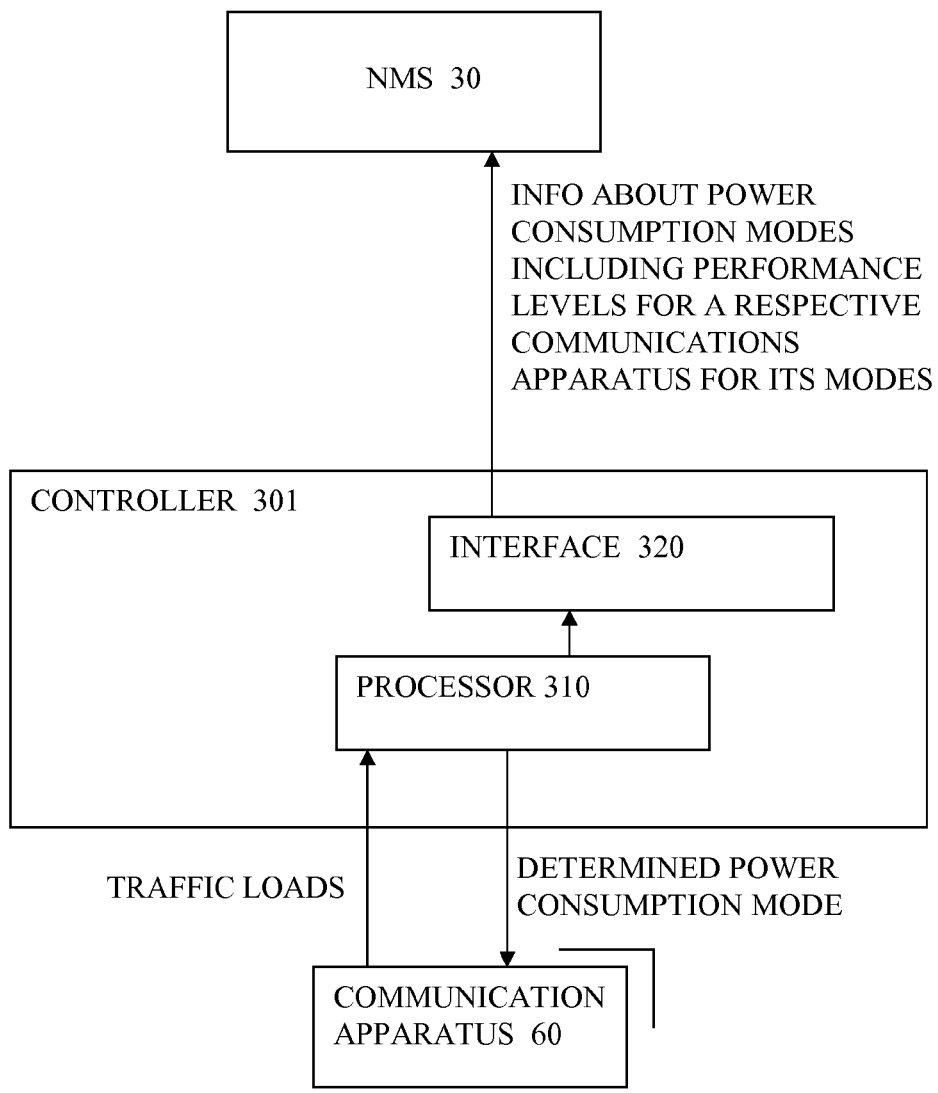
FIG. 11 shows a schematic view of a network according to another embodiment, arranged to send performance levels to the NMS.
Figure 12:
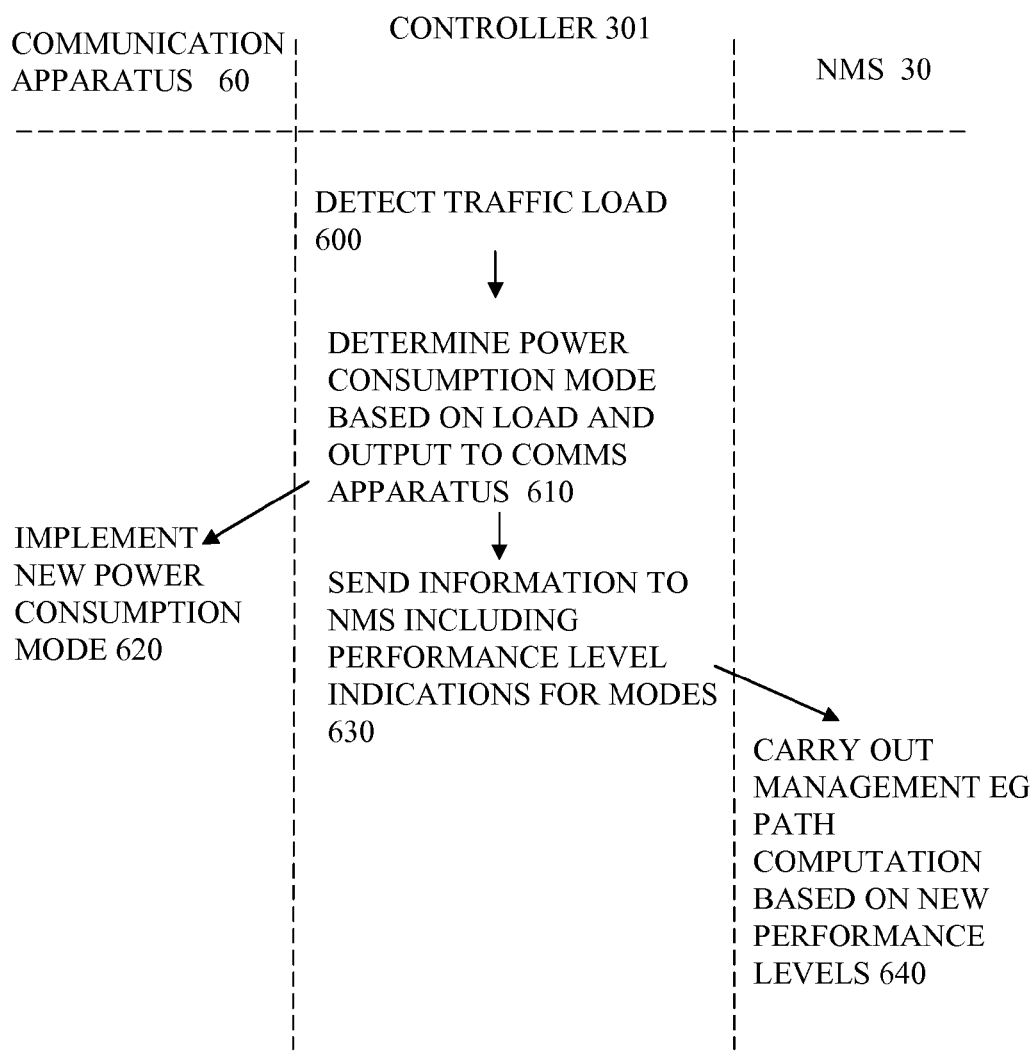
FIG. 12 shows a time chart showing steps for an embodiment corresponding to that of FIG. 11.

FIGS. 11, 12, Controller

FIG. 11 shows a schematic view of a network according to another embodiment, to show an example of a controller coupled to an NMS and arranged to send performance levels for power consumption modes to the NMS. It shows the controller has a processor 310 configured to determine power consumption modes for at least one of the communications apparatus based on traffic load. The determined power consumption mode can be output to the respective communications apparatus. An interface 320 is provided to the NMS, to send information about the power consumption modes of respective ones of the communications apparatus. Indications of the different levels of performance in passing the traffic for the respective power consumption modes can be sent to the NMS from the controller.

FIG. 12 shows a corresponding time chart for operation of the embodiment of FIG. 11. The left column shows operations of the communications apparatus, the central column shows the operations of the controller 301, and the right column shows the actions of the NMS. Time flows downwards. At step 600 the traffic load is detected by controller 301. Power consumption mode is determined based on load and is output to the communications apparatus at step 610. The new power consumption mode is implemented at step 620. At step 630 information is sent to the NMS including performance level indications for the modes. At step 640 the NMS can carry out management such as path computation based on new performance levels.

Figure 13:
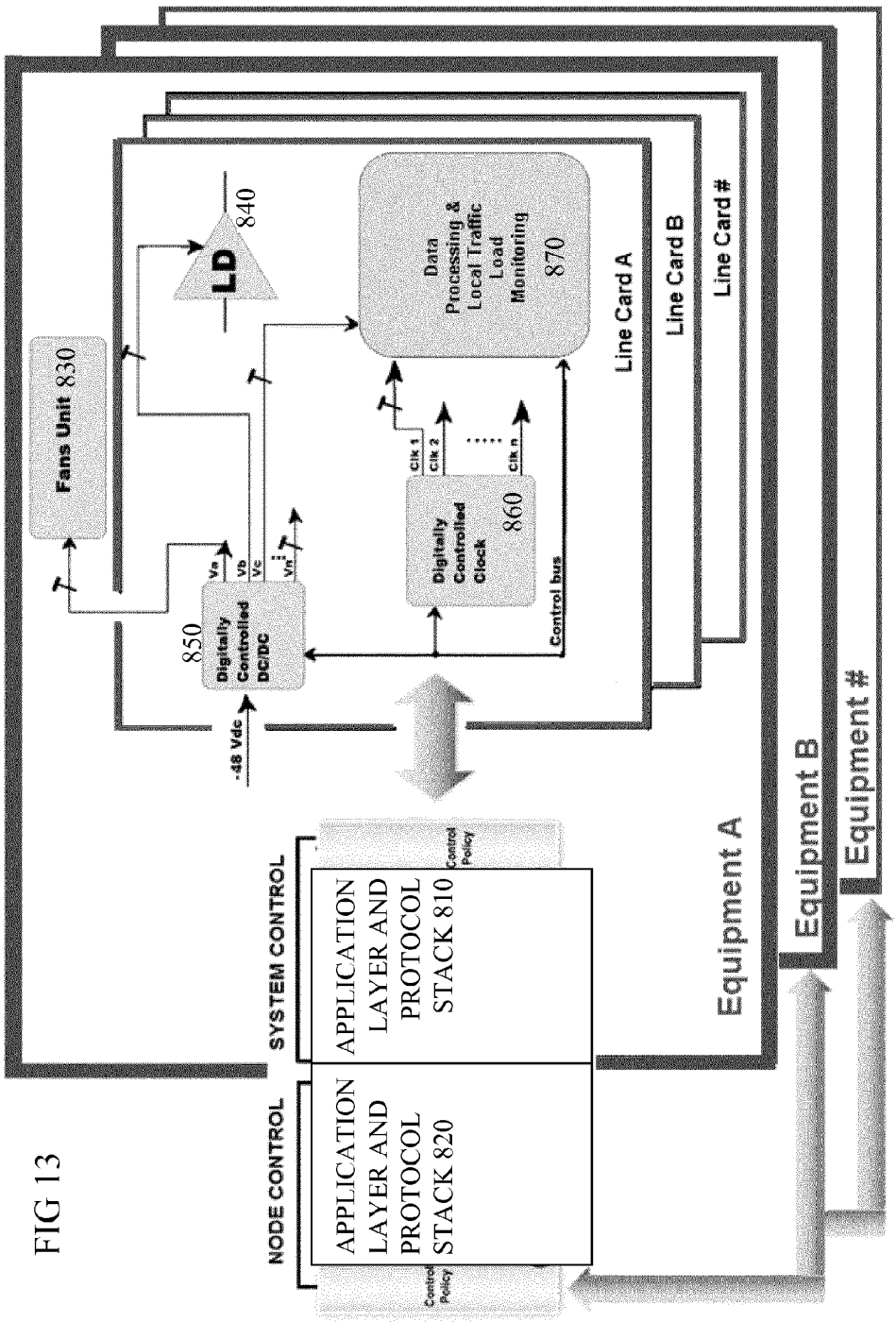
FIG. 13 shows examples of communications apparatus in the form of equipments having cards of circuitry which can have different power consumption modes.

FIG. 13, Embodiment Communications Apparatus Examples

FIG. 13 shows examples of communications apparatus in the form of a number of equipments A, B, # each having a number of cards of circuitry, and all belonging to a node. A common part for the node is a node control part having an application layer and protocol stack 820 which communicates with a corresponding system control part on each equipment, having an application layer and protocol stack 810. Equipment A has circuitry which is shown in more detail, including line cards A, B and #. Line card A has circuitry which can have different power consumption modes, including a digitally controlled DC/DC power supply 850 for outputting power supply lines to other circuitry. Also shown is a digitally controlled clock 860, a transmitter in the form of a laser diode LD 840, and a circuit 870 for data processing and local traffic load monitoring. A fan unit 830 is provided with speed control by means of a controllable supply voltage. A control bus is provided between the various elements of the card. The controller or slave mode controller described above can optionally be implemented as part of the application layer at the node control or system control part. These parts can communicate with the NMS through a communications link (not shown). They can communicate with the communications apparatus through the protocol stack of the node control or the system control parts, to implement the power consumption mode control methods described above.

Figure 14:
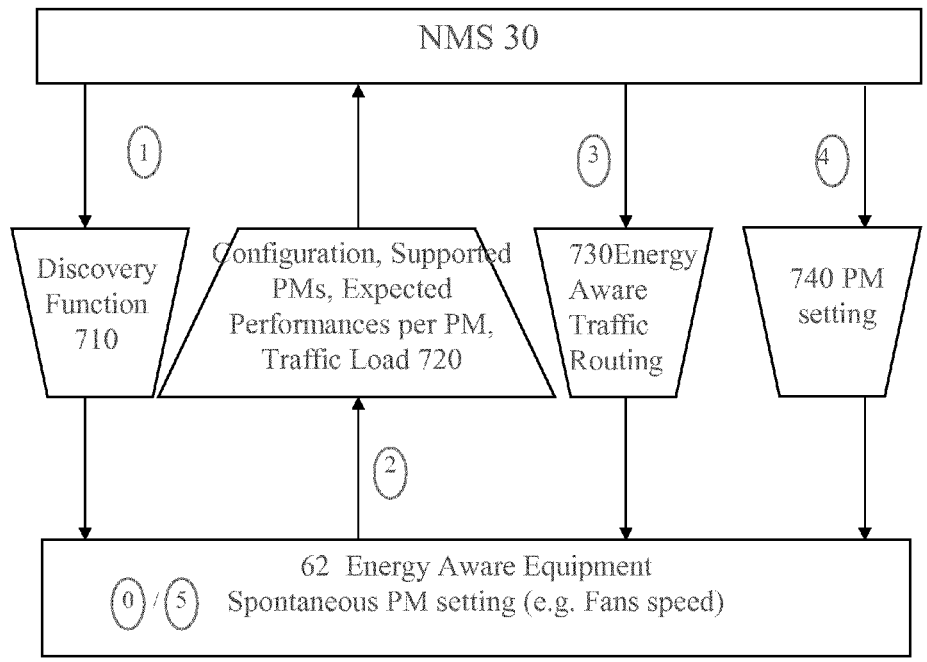
FIGS. 14 and 15 show functional diagrams with time sequences of events according to embodiments and indicating flow of information between the NMS and the communications apparatus.
Figure 15:
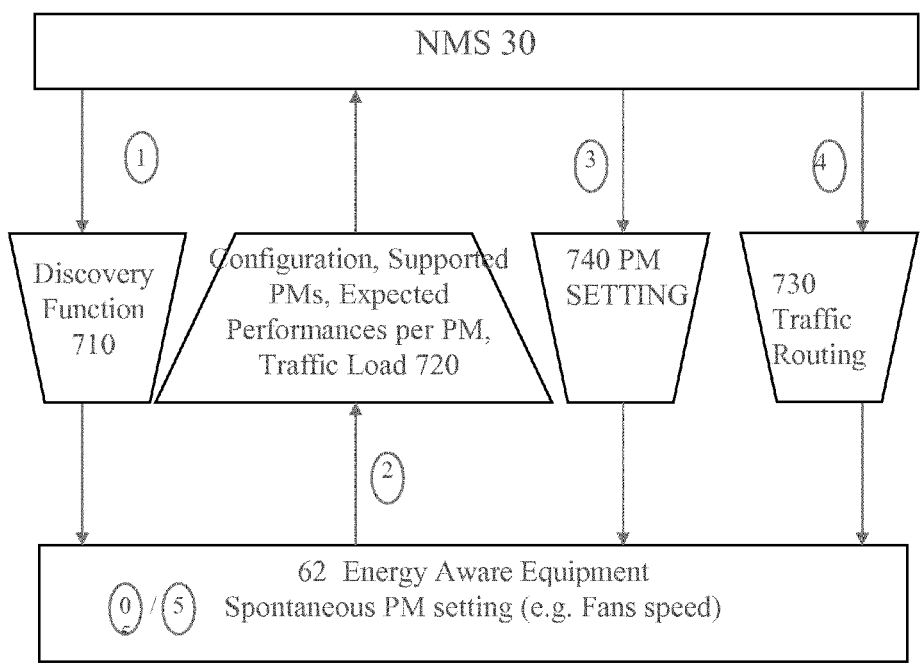

FIGS. 14, 15, Another Embodiment

FIGS. 14 and 15 show functional diagrams with time sequences of events flowing from left to right, according to embodiments. The sequence of events is also indicated by numbers 0-5. The functions are shown with arrows indicating flow of information between the NMS 30 and the communications apparatus in the form of energy aware equipment 62. In order to guarantee QoS, coordination between Traffic Load and PMM can be achieved by means of the following procedure.

The Energy Aware NMS 30 can first:
  Run an Energy Aware "Discovery Function" (step 710)
By running the Energy Aware "Discovery Function" the Energy Aware NMS gets following information by each Energy Aware equipment subtended (step 720):
  Get supported Power Management Modes
  Get expected performances (max traffic throughput, latency, power consumption, transition time, i.e. time to sleep and time to wakeup) per each supported PMM
  Get actual Traffic Load per each card/interface
  Get actual (measured) power consumption (this is optional, not strictly required)
The Energy Aware NMS computes (step 730) the optimal Energy Aware Traffic Routing and Power Management Modes. Per each element or card, the Energy Aware NMS sets (in the following order when reducing performances, in reverse order when increasing performances, as shown in FIG. 15) the following:
  Set Traffic Routing, (730) in order to maximize the energy saving obtainable by applying the available set of PMMs.
  Set PMMs (step 740) accordingly to the actual Traffic Load. E.g. as slack hours approach, the EA NMS can first route traffic to fill few resources and then can put to sleep remaining resources; while when busy hours approach, first it can wake up resources and then it can route traffic to share load on resources made available.
The Energy Aware equipment can communicate with the Energy Aware NMS by means of a generic North Bound interface, as with any generic Network Manager entity. Note that some part of the equipment can spontaneously decide Low Power settings, such as reducing Fan Tray speed, etc. before the Energy Aware procedure for instance as function of ambient temperature change, and/or after the Energy Aware procedure for instance turning off Fans corresponding to cards set in Power-Off.

Information Model Example

A list of gets and sets for an embodiment can be as follows:

```
Get Card type ← (e.g. SDH, OTN, 1G, 100G, WDM, . . .)
Get Card Configuration ← (main, sdtby, IEEE1588, Eth, IP, . . .)
Set PM_1 → On_Max (dc/dc max; clock speed max; . . .)
Set PM_2 → e.g. IEEE in reset
Set PM_3 → Interface 1 Tx_off
Set PM_4 → Interface 2 Tx_off
. . .
Set PM_n → Interface n Tx_off
Set PM_o → Deep_Sleep (dc/dc min; clock speed null; . . .)
Set PM_p → Power_Off (BPM dc/dc off; . . .)
Get PM_1 ← throughput; power; latency
Get PM_2 ← throughput; power; latency
. . .
Get PM_p ← throughput; power; latency
Get Actual Traffic Load ← element 1
Get Actual Traffic Load ← element 2
. . .
Get Actual Traffic Load ← element n
```

Note that: An on board uP or other controller can decide itself to enter a spontaneous Low Power setting, e.g. by reducing Traffic Engine clock speed if for instance less than x traffic paths are on. A common part common to multiple circuits can spontaneously decide on a Low Power setting, e.g. to reduce Fans Tray speed.

Actual Traffic Load

A notable issue for any method aimed to dynamic adaptation as function of traffic load, is an effective procedure to get the Actual Traffic Load; this is not necessarily an easy task, bearing in mind the following:
  i) Energy Aware NMS could subtend a huge number of Network Elements
  ii) Traffic Load get-procedure should be as prompt as possible, minimizing the time between the get and the correspondent PMM set so nullifying the risk of QoS impacts by inconsistent setting due to not detected traffic load changes
  iii) A top-down cycling polling procedure risks overloading the Energy Aware NMS if too frequent, while if too slow risks introducing unacceptable delay between Traffic Load gathering and consequent PMM setting (e.g. gathering mechanism each 15 minutes, such as for Performances Counters, risks to be too slow to guarantee QoS or anyhow the optimal effectiveness of the energy saving mechanism; while it is still not able to guarantee to not overload the EA NMS when subtending a very large number of elements)
A solution to such issues is as follows:
  i) Each element can provide spontaneous indication (down-top) of the proper Traffic Load status just when strictly needed
  ii) Per each PM of each element there will be defined two Traffic Load thresholds, upper and lower, such to discriminate if actual Traffic Load is in line with actual performances capability, or if it is getting dangerously close to max allowed capability, or if traffic load is too low i.e. there is oversized capability.

Each element can compute autonomously the proper Traffic Load status by watching the local "packets counters" comparing the result with locally stored thresholds, selected as a function of the given (actual) PM setting (the convenience to provide threshold levels update capability by the EA NMS for instance during the Discovery Phase or overtime can be evaluated).

According to threshold comparison outcome, the element can:
  i) Send an Urgent Request towards the EA NMS, for a higher performing PMM setting, as soon as Traffic Load is above the upper threshold (dark flag in FIG. 10).
  ii) Send a Not-urgent Request towards the EA NMS, for a lower performing PMM setting, as soon as Traffic load is below the lower threshold (light flag in FIG. 10).
  iii) Don't send any request (don't do nothing), as long as Traffic Load is in between the two thresholds.

The EA NMS can promptly react to Urgent Requests by computing and providing the new (higher performing) PM and/or new Traffic Routing configurations redistributing the traffic so to off-load the critical elements.

The EA NMS can react with a lower priority to Not-urgent Requests by computing and providing the new (lower performing) PM and/or new Traffic Routing configurations redistributing the traffic so to properly utilize capabilities.

By means of this method, Energy Aware NMS is spared from the need to ask repeatedly for actual traffic load from any subtended element. The Energy Aware NMS can anyhow maintain the ability to request in a timely manner the exact percentage of the Traffic Load of a given element, for unexpected needs or for further refinement of the load distribution. In case of temporary unavailability of the Energy Aware NMS, for safety reasons the On-Maximum configuration (i.e. maximum performances) can be superimposed by the element's local controls. As soon as the Energy Aware NMS resumes, it will start a new "Discovery Function".

FIGS. 16-18, EA Traffic Routing Example

Operation of a path computation apparatus will now be discussed in more detail by way of example with reference to FIGS. 16 to 18 which show a three Node network portion, to exploit EA Traffic Routing when it comes to Dynamic Performance Adaptation to Traffic Load capable devices. There are three nodes A, B and C, linked by links A-B, B-C, and A-C. In the three nodes Energy Aware Network of the example, traffic between Node A and Node B is reduced step by step monitoring per each step the relevant traffic load (as discussed above in relation to FIGS. 14 and 15 for example). Operational power consumption modes are set accordingly, until reaching traffic load levels that can be managed in such a way that can be routed through alternative paths. As soon as these alternative paths can fully satisfy the actual traffic load, link A-B in example can assume deeper and deeper sleeping power modes, such as Fast Sleeping, Deep Sleeping or Power Off.

This can be achieved by the centralized at Node or Network level EA NMS or locally by the equipment (energy aware) control, by means of comparison of the Actual Traffic with lower ↓ and higher ↑ Traffic Thresholds, set in respect to the max throughput of each Node or Link.

FIG. 16 shows a first traffic flow condition for high performance (A-B in double link, A-C, B-C):
  If traffic load reduces to a second traffic flow condition, then as shown in FIG. 17 all active traffic will be routed to just one of the two links A-B and the other link enters the first sleeping mode, i.e. Fast Sleeping status, as soon as Traffic at both A-B links is low enough compared to the maximum throughput, i.e. below the "↓ threshold <<max throughput" (as an example trigger can be at 2G assuming link max throughput is 10G). One link runs 4G (out of 10G max, assuming Operational mode according to 4G traffic, in the example) the other sleeps with promptest wake-up time. Note that this control could be local, without direct intervention of the centralized EA NMS, which should just be kept up to date with what's going on.
  if Traffic A-B further decreases (very slack hours), the sleeping link can enter a deeper sleeping mode, e.g. Deep Sleeping status, as soon as Traffic A-B is below the "↓ threshold <<<max throughput" (as an example trigger can be at 500 Kbps assuming link is 10G). One link runs 500 Kbps (out of 10G max) while the other deep sleeps.
  if also Traffic A-C and Traffic B-C proportionally decreases, the EA NMS will route all active traffic between Node A and Node B (i.e. the residual 500 Kbps of traffic at A-B, in this example) towards the Node C as soon as Traffic A-C and Traffic B-C is below the "↓ threshold <<max throughput", (say 2G assuming link is 10G) running 2.5G out of 10G max (it will be duty of the centralized EA NMS ensures that the routed traffic is sustainable by the receiving Node/Link). Remaining Operational link A-B can now go into a sleeping mode, entering the Fast Sleeping mode while the sleeping link A-B can enter the deepest sleeping mode, e.g. Power Off.
  if Traffic A-C and Traffic B-C further decreases (e.g. deep night, winter time at beach villages, etc.), as soon as Traffic A-C and Traffic B-C is below the "↓ threshold <<<max throughput", (say 500 Kbps assuming link is 10G) links A-B can go into Deep Sleeping and Power Off mode respectively, or even both at Power Off, maximizing power consumption saving, as shown in FIG. 18.

Note how the method is capable of adequate tradeoff between traffic margin and sleeping Power consumption modes in order to guarantee QoS in case of sudden peaks of traffic.
  when Traffic A-C and Traffic B-C increases (traffic is ramping up, such as in the early morning), as soon as Traffic A-C and/or Traffic B-C is above the "↑ threshold <<<max throughput", (as an example trigger can be at 1G assuming link is 10G), one of the links A-B will be forced to entering e.g. Fast Sleeping while the other can stay in Power Off (see FIG. 17).
  if Traffic A-C and Traffic B-C further increases, now the EA NMS will set at a suitable Operational mode one of the links A-B and then will route all active traffic between Node A and Node B back towards the operating link A-B as soon as Traffic A-C and/or B-C is above the "↑ threshold <<max throughput" (as an example trigger can be at 4G assuming link max throughput is 10G; it will be a duty of the centralized EA NMS to ensure that the routed traffic is sustainable by the Operational mode of the receiving Node/Link). The sleeping link A-B will go back to a less deep sleeping mode, e.g. Deep Sleeping.
  If Traffic A-B further increases, the operational mode will be set accordingly at the operating link, while a less deeper sleeping mode, e.g. Fast Sleeping status will be set for the sleeping link, as soon as Traffic A-B is above the ↑ threshold <<<max throughput (say 1G assuming link is 10G).

As soon as Traffic A-B further increases, the entering of an Operating PM of the still sleeping link will be forced, as soon as Traffic A-B is above the ↑ threshold <<max throughput, as shown in FIG. 16 (as an example trigger can be at 4G assuming link max throughput is 10G). From now on, Operational power consumption mode transition can occur at given thresholds as a function of traffic load.

Figure 19:
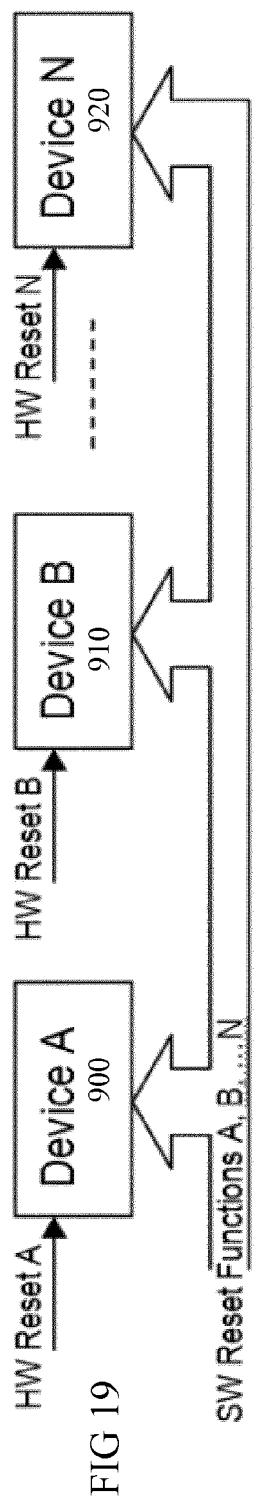
FIGS. 19 to 21 show examples of communications apparatus partitioned to provide selective resets, selective clock control and selective power supply control respectively, to enable operation in different power consumption modes.
Figure 20:
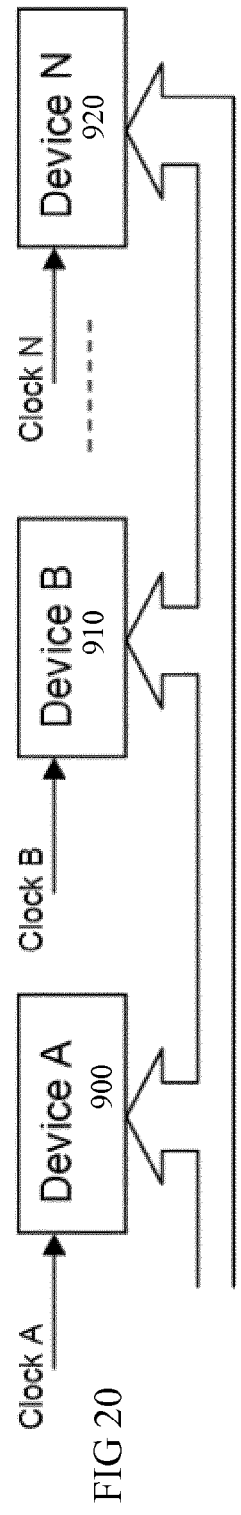
Figure 21:
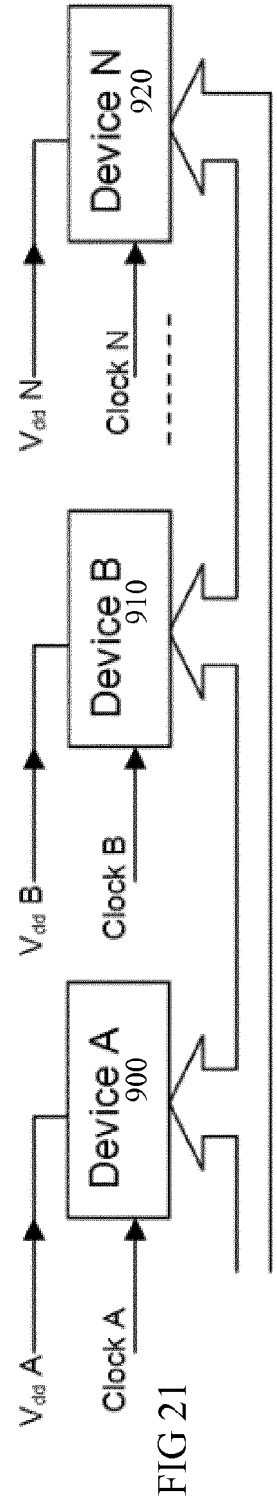

FIGS. 19-21 Power Consumption Mode Primitives: Reset, Clock, Power Partitioning

According to some examples of the herein proposed methods, Power Consumption Modes can make use of one or more of three main techniques: Reset Partitioning, Clock Partitioning and Scaling, and Power Supply Partitioning and Scaling. They can be applied in various mixes of configurations according to the available circuitry, and will now be explained in more detail.

FIG. 19, Reset Partitioning

Reset functions can be multiple, partitioned (selective reset) such that at any single card or subsystem can also apply selective resets to any device or single section of the given card by means of dedicated reset functions. FIG. 19 shows devices A, B and C (900, 910 and 920, respectively) which have for example HW resets by means of dedicated wires, and/or SW reset by means of dedicated functions controlled by software. In one example, as a function of the device, a SW reset of a circuit portion, e.g. a Transmitter, could avoid affecting for instance PLL synchronization or bus synchronization, which would normally suffer a reset at the same time. Hence such a selective reset can speed up wake up time and lower impacts on neighboring devices. While HW reset can provide consistently lower power consumption but require longer wake up time.

FIG. 20, Clock Partitioning and Scaling

Clock Partitioning and Scaling is a technique where clock frequency of a µP or of a Network Processor or any other applicable engine can be dynamically and selectively adjusted "on the fly", saving power and reducing the amount of generated heat by the given chip. FIG. 20 shows devices A, B and C (900, 910 and 920, respectively). Each device can have its own dedicated clock, sourced by a multi-output Frequency Synthesizer (e.g. Digitally Controlled Oscillators, Numerically Controlled Oscillators, Prescalers, etc.). Frequency scaling reduces the number of instructions a processor can issue in a given amount of time, thus also reducing performance.

FIG. 21 Power Partitioning and Scaling

Power Supply distribution can be partitioned with the granularity allowed by the specific design; identifying all the devices that can be switched off in particular configurations or that can be supplied by a reduced Voltage Supply. FIG. 21 shows devices A, B and C (900, 910 and 920, respectively). Each of these devices can have a power supply line separated and independently managed from the others.

Dynamic Voltage Scaling may be used in conjunction with frequency scaling, as the frequency that a chip may run at is related to the operating voltage. According to the given formula the saving by applying Voltage Scaling is proportional to the square of the voltage step applied, i.e. to $\Delta V^2$, and thus could be particularly important.

By applying circuit partitioning, several different "islands" or domains are created over the given card and/or equipment and/or given component (FPGA, etc. since the herein described techniques can apply also at internal chip architectures). Domains can be related to a given function, interface, process, single chips, circuit portions, etc. and should be tailored so as to share with other domains the lowest possible numbers of interconnections at the lowest possible frequency speed. In the case of Voltage Scaling sometimes Level Translators can be recommended for connections between domains.

Concluding Remarks

Nowadays power consumption is almost independent of traffic load. Until today designs have a behavior Power vs. Load showing null or poor power consumption variation as function of traffic loads. With the proposed Energy Aware design methods, it is possible to maximize the power consumption dependency to the traffic load as well as adding significant sleeping states to further improve the energy saving possibilities. The method allows dynamically adapting network performances to actual traffic load, hence maximizing the saving of power. By means of the herein described method notable saving in terms of GHG emissions as well as in terms of operational expenditures can be achieved.

The invention claimed is:

1. A network management system for a communications network, the network having nodes, at least one of the nodes comprising communications apparatus capable of being operated in different power consumption modes which provide different levels of performance in passing communications traffic, the network management system comprising:
    an interface configured to operatively couple the network management system to the nodes;
    a path computation apparatus configured to select paths for the traffic using the communications apparatus, based on information about traffic load in the network and on information about the power consumption modes of the communications apparatus of at least one of the nodes; and
    a power mode controller coupled to the path computation apparatus for controlling the power consumption modes of at least one of the communications apparatus according to information about traffic load and according to information about the paths selected,
    wherein the power mode controller is configured to control the power consumption modes for at least one of the communications apparatus in response to a request received via the interface from a respective communications apparatus for a different power consumption mode when it detects that its traffic load has reached a traffic threshold.

2. The network management system of claim 1, the path computation apparatus being configured to receive from the communications apparatus, indications of the different levels of performance in passing the traffic for their respective power consumption modes, and to carry out the path computation according to such indications.

3. The network management system of claim 1, wherein for conditions of decreasing traffic load, the network management system is configured such that the path computation apparatus carries out a path computation and the power mode controller is configured to subsequently control the power consumption modes on the basis of the path computation.

4. The network management system of claim 1, wherein for conditions of increasing traffic load, the network management system is configured such that the power mode controller controls the power consumption modes and the path computation apparatus is configured to carry out the path computation subsequently on the basis of the power consumption modes.

5. A slave power mode controller for a communications network, the network having nodes, at least one of the nodes comprising communications apparatus capable of being operated in different power consumption modes which have different levels of performance in passing communications traffic, the network also having a network management system, the slave power mode controller comprising:

a first interface for communication with the network management system;

a second interface configured to operatively couple the slave power mode controller to the nodes; and a processor coupled to the first interface to receive power consumption mode commands from the network management system, and configured to determine power consumption modes for at least one of the communications apparatus based on the received power consumption mode commands, and to output the determined power consumption modes to the respective communications apparatus, wherein the processor is configured to detect when the traffic load for one of the communications apparatus reaches a traffic threshold, and to send a request to the network management system for a command to alter the power consumption mode.

6. The slave power mode controller of claim 5, the first interface being configured to send to the network management system, indications of the different levels of performance in passing the traffic for respective power consumption modes of a respective one of the communications apparatus.

7. The slave power mode controller of claim 6, configured to set the traffic threshold according to the current power consumption mode.

8. The slave power mode controller of claim 5, the traffic threshold comprising at least a lower traffic threshold and an upper traffic threshold, and the processor being configured to send a request for a lower power consumption mode when the traffic load reaches that lower traffic threshold, and to send a request for a higher power consumption mode when the traffic load reaches that higher traffic threshold.

9. The controller of claim 5, the first interface being configured to send an update of traffic information to the network management system when the traffic load reaches a traffic threshold.

10. The controller of claim 5, at least one of the power consumption modes comprising a definition of selective resetting of a portion of circuitry of a respective communications apparatus, to be carried out when the power consumption mode is changed.

11. A method of managing a communications network, the network having nodes, at least one of the nodes comprising communications apparatus capable of being operated in different power consumption modes which have different levels of performance in passing communications traffic, the method comprising:

operating an interface configured to operatively couple the network management system to the nodes;

selecting paths for the traffic using the communications apparatus, based on information about the traffic in the network and on information about the power consumption modes of the communications apparatus;

controlling the power consumption modes of at least one of the communications apparatus according to information about the traffic and information about the paths selected for the traffic;

receiving a request via the interface from a respective communications apparatus of at least one of the communications apparatus, wherein the request is a request for a different power consumption mode when it detects that its traffic load has reached a traffic threshold;

controlling the power consumption modes for the at least one of the communications apparatus in response to the received request.

12. A method of controlling power consumption modes in a communications network, the network having nodes, at least one of the nodes comprising communications apparatus capable of being operated in different power consumption modes which have different levels of performance in passing communications traffic, the method comprising:

operating an interface that is operatively coupled to the nodes;

receiving power consumption mode commands from the network management system;

determining power consumption modes for at least one of the communications apparatus based on the received power consumption mode commands;

outputting the determined power consumption modes via the interface to the respective communications apparatus;

and detecting when the traffic load for one of the communications apparatus reaches a traffic threshold, and sending a request to the network management system for a command to alter the power consumption mode.

13. A nontransitory computer readable storage medium having instructions which, when executed by a computer, cause the computer to carry out a method of managing a communications network, the network having nodes, at least one of the nodes comprising communications apparatus capable of being operated in different power consumption modes which have different levels of performance in passing communications traffic, the method comprising:

operating an interface configured to operatively couple the network management system to the nodes;

selecting paths for the traffic using the communications apparatus, based on information about the traffic in the network and on information about the power consumption modes of the communications apparatus;

controlling the power consumption modes of at least one of the communications apparatus according to information about the traffic and information about the paths selected for the traffic;

receiving a request via the interface from a respective communications apparatus of at least one of the communications apparatus, wherein the request is a request for a different power consumption mode when it detects that its traffic load has reached a traffic threshold;

controlling the power consumption modes for at least one of the communications apparatus in response to the received request.

14. A method of controlling power consumption modes in a communications apparatus capable of being operated in different power consumption modes which have different levels of performance in passing communications traffic, the method comprising:

receiving a power consumption mode command from a power mode controller that is operatively connected to at least one other communications apparatus;

detecting traffic load; and detecting when the traffic load has reached a traffic threshold, and if so, sending a request to the power mode controller to change the power consumption mode.

15. A communications apparatus operable in different power consumption modes which have different levels of performance in passing communications traffic, the communications apparatus comprising:
- a command receiver configured to receive a power consumption mode command from a power mode controller that is operatively connected to at least one other communications apparatus;
- a detector configured to detect traffic load; and
- a controller, wherein the controller is configured to detect when the traffic load has reached a traffic threshold, and if so, to send a request to the power mode controller to change the power consumption mode.

\* \* \* \* \*

UNITED STATES PATENT AND TRADEMARK OFFICE
CERTIFICATE OF CORRECTION

PATENT NO.      : 9,825,811 B2
APPLICATION NO. : 14/432210
DATED           : November 21, 2017
INVENTOR(S)     : Grosso et al.

It is certified that error appears in the above-identified patent and that said Letters Patent is hereby corrected as shown below:

On the Title Page

In the Figure, in Step "150", Line 2, delete "COMSUMPTION" and insert -- CONSUMPTION --, therefor.

On Page 2, in Item (56), under "OTHER PUBLICATIONS", in Column 1, Line 1, delete "draft-ieff-eman-" and insert -- draft-ietf-eman- --, therefor.

On Page 2, in Item (56), under "OTHER PUBLICATIONS", in Column 2, Line 14, delete "(MTMN)" and insert -- (MTNM) --, therefor.

On Page 2, in Item (56), under "OTHER PUBLICATIONS", in Column 2, Line 17, delete "(MTMN)" and insert -- (MTNM) --, therefor.

In the Drawings

In Fig. 1, Sheet 1 of 16, delete "FIG" and insert -- FIG. --, therefor at each occurrence throughout the figures.

In Fig. 3, Sheet 3 of 16, in Step "150", Line 2, delete "COMSUMPTION" and insert -- CONSUMPTION --, therefor.

In Fig. 4, Sheet 4 of 16, in Step "270", Line 2, delete "COMSUMPTION" and insert -- CONSUMPTION --, therefor.

In Fig. 6, Sheet 6 of 16, delete "COMMUNICATION S APPARATUS 60" and insert -- COMMUNICATIONS APPARATUS 60 --, therefor.

Signed and Sealed this
Tenth Day of July, 2018

Andrei Iancu
*Director of the United States Patent and Trademark Office*

In Fig. 14, Sheet 14 of 16, in Step "740", Line 1, delete "PM" and insert -- PMMs --, therefor.

In Fig. 15, Sheet 14 of 16, in Step "740", Line 1, delete "PM" and insert -- PMMs --, therefor.

In the Specification

In Column 1, Line 49, delete "ietforg/doc/draft-" and insert -- ietf.org/doc/draft- --, therefor.

In Column 3, Line 35, delete "example" and insert -- example. --, therefor.

In Column 5, Line 45, delete "methods" and insert -- methods. --, therefor.

In Column 6, Lines 52-53, delete "Interface Specification" and insert -- Interface --, therefor.

In Column 6, Line 54, delete "Desktop" and insert -- Distributed --, therefor.

In Column 9, Line 57, delete "running)" and insert -- running). --, therefor.

In Column 12, Line 7, delete "Some time" and insert -- Sometime --, therefor.

In Column 14, Line 26, delete "Power mode (PMM)" and insert -- Power management mode (PMM) --, therefor.

In Column 16, Line 29, delete "uP" and insert -- μP --, therefor.

In Column 16, Line 57, delete "elements)" and insert -- elements). --, therefor.

In Column 18, Line 11, delete "if" and insert -- If --, therefor.

In Column 18, Line 18, delete "if" and insert -- If --, therefor.

In Column 18, Line 31, delete "if" and insert -- If --, therefor.

In Column 18, Line 43, delete "when" and insert -- When --, therefor.

In Column 18, Line 50, delete "if" and insert -- If --, therefor.

In the Claims

In Column 21, Line 40, in Claim 9, delete "controller" and insert -- slave power mode controller --, therefor.

In Column 21, Line 44, in Claim 10, delete "controller" and insert -- slave power mode controller --, therefor.

CERTIFICATE OF CORRECTION (continued)
U.S. Pat. No. 9,825,811 B2

In Column 22, Line 22, in Claim 12, delete "and" and insert the same at Lines 20-21, after "apparatus;" as a continuation sub-point.